(12) United States Patent
van Hook et al.

(10) Patent No.: US 7,197,625 B1
(45) Date of Patent: *Mar. 27, 2007

(54) ALIGNMENT AND ORDERING OF VECTOR ELEMENTS FOR SINGLE INSTRUCTION MULTIPLE DATA PROCESSING

(75) Inventors: Timothy J. van Hook, Atherton; Peter Hsu, Fremont; William A. Huffman, Los Gatos; Henry P. Moreton, Woodside; Earl A. Killian, Los Altos Hills, all of CA (US)

(73) Assignee: MIPS Technologies, Inc., Mountain View, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 09/662,832

(22) Filed: Sep. 15, 2000

Related U.S. Application Data

(63) Continuation of application No. 09/263,798, filed on Mar. 5, 1999, now Pat. No. 6,266,738, which is a continuation of application No. 08/947,649, filed on Oct. 9, 1997, now Pat. No. 5,933,630.

(51) Int. Cl.
*G06F 15/80* (2006.01)
*G06F 9/312* (2006.01)

(52) U.S. Cl. .............................. 712/22; 712/4; 712/227

(58) Field of Classification Search .................... 712/2, 712/22, 20, 1, 4, 3, 5, 204, 6, 7, 17, 8, 9, 712/21, 120, 98, 19, 23, 24, 25, 248, 36, 712/210, 41, 213, 42, 273, 245, 300; 711/201, 711/153, 208, 148, 209, 171, 212, 172, 219; 710/50, 51, 66, 33, 127, 34
See application file for complete search history.

(56) References Cited

U.S. PATENT DOCUMENTS 3,654,621 A    4/1972  Bock et al. ............... 340/172.5

3,916,388 A    10/1975 Shimp et al. ............ 340/172.5

(Continued)

FOREIGN PATENT DOCUMENTS

| EP | 0 681 236 A1 | 11/1995 |
|---|---|---|
| EP | 0 681 236 B1 | 11/2000 |
| WO | WO 97/07450 A1 | 2/1997 |
| WO | WO 97/08608 A1 | 3/1997 |

OTHER PUBLICATIONS

*An Introduction to Thumb*™, Version 2.0, Advanced RISC Machines, 29 pages (Mar. 1995).

(Continued)

*Primary Examiner*—Daniel H. Pan
(74) *Attorney, Agent, or Firm*—Sterne Kessler Goldstein & Fox PLLC

(57) ABSTRACT

The present invention provides alignment and ordering of vector elements for SIMD processing. In the alignment of vector elements for SIMD processing, one vector is loaded from a memory unit into a first register and another vector is loaded from the memory unit into a second register. The first vector contains a first byte of an aligned vector to be generated. Then, a starting byte specifying the first byte of an aligned vector is determined. Next, a vector is extracted from the first register and the second register beginning from the first bit in the first byte of the first register continuing through the bits in the second register. Finally, the extracted vector is replicated into a third register such that the third register contains a plurality of elements aligned for SIMD processing. In the ordering of vector elements for SIMD processing, a first vector is loaded from a memory unit into a first register and a second vector is loaded from the memory unit into a second register. Then, a subset of elements are selected from the first register and the second register. The elements from the subset are then replicated into the elements in the third register in a particular order suitable for subsequent SIMD vector processing.

18 Claims, 17 Drawing Sheets

| vd[7] | vd[6] | vd[5] | vd[4] | vd[3] | vd[2] | vd[1] | vd[0] |
|---|---|---|---|---|---|---|---|
| 0 | vs[7] | 0 | vs[6] | 0 | vs[5] | 0 | vs[4] |
| 0 | vs[3] | 0 | vs[2] | 0 | vs[1] | 0 | vs[0] |
| sign vs[7] | vs[7] | sign vs[6] | vs[6] | sign vs[5] | vs[5] | sign vs[4] | vs[4] |
| sign vs[3] | vs[3] | sign vs[2] | vs[2] | sign vs[1] | vs[1] | sign vs[0] | vs[0] |
| vs[7] | vs[5] | vs[3] | vs[1] | vt[7] | vt[5] | vt[3] | vt[1] |
| vs[6] | vs[4] | vs[2] | vs[0] | vt[6] | vt[4] | vt[2] | vt[0] |
| vs[7] | vt[7] | vs[6] | vt[6] | vs[5] | vt[5] | vs[4] | vt[4] |
| vs[3] | vt[3] | vs[2] | vt[2] | vs[1] | vt[1] | vs[0] | vt[0] |

U.S. PATENT DOCUMENTS

| | | | |
|---|---|---|---|
| 4,023,023 A | 5/1977 | Bourrez et al. | 235/152 |
| 4,109,310 A | 8/1978 | England et al. | 364/200 |
| 4,128,880 A | 12/1978 | Cray, Jr. | 364/200 |
| 4,130,880 A | 12/1978 | Nutter | 364/900 |
| 4,219,874 A | 8/1980 | Gusev et al. | 364/200 |
| 4,317,170 A | 2/1982 | Wada et al. | 364/200 |
| 4,396,982 A | 8/1983 | Wada et al. | 364/200 |
| 4,491,910 A | 1/1985 | Caudel et al. | 364/200 |
| 4,507,731 A | 3/1985 | Morrison | 364/200 |
| 4,511,990 A | 4/1985 | Hagiwara et al. | 708/501 |
| 4,520,439 A | 5/1985 | Liepa | 364/200 |
| 4,583,199 A | 4/1986 | Boothroyd et al. | 364/900 |
| 4,773,006 A | 9/1988 | Kinoshita et al. | 364/200 |
| 4,809,212 A | 2/1989 | New et al. | |
| 4,814,976 A | 3/1989 | Hansen et al. | 364/200 |
| 4,879,676 A | 11/1989 | Hansen | 708/505 |
| 4,928,223 A | 5/1990 | Dao et al. | |
| 5,150,290 A | 9/1992 | Hunt | 364/736 |
| 5,185,713 A | 2/1993 | Kobunaya | 708/501 |
| 5,392,228 A | 2/1995 | Burgess et al. | 708/205 |
| 5,418,915 A | 5/1995 | Matuda et al. | 395/325 |
| 5,499,299 A | 3/1996 | Takenaka et al. | |
| 5,513,366 A | 4/1996 | Agarwal et al. | 395/800 |
| 5,517,438 A | 5/1996 | Dao-Trong et al. | 708/501 |
| 5,537,562 A * | 7/1996 | Gallup et al. | 712/234 |
| 5,550,768 A | 8/1996 | Ogilvie et al. | 708/497 |
| 5,581,773 A | 12/1996 | Glover | 395/800 |
| 5,590,345 A | 12/1996 | Barker et al. | 395/800 |
| 5,666,298 A | 9/1997 | Peleg et al. | 364/715.08 |
| 5,669,010 A | 9/1997 | Duluk, Jr. | 395/800.22 |
| 5,671,401 A | 9/1997 | Harrell | 345/505 |
| 5,721,892 A | 2/1998 | Peleg et al. | 395/562 |
| 5,726,927 A | 3/1998 | Wolrich et al. | 708/620 |
| 5,729,724 A | 3/1998 | Sharangpani et al. | 712/222 |
| 5,734,874 A | 3/1998 | Van Hook et al. | 395/513 |
| 5,740,340 A | 4/1998 | Purcell et al. | 395/118 |
| 5,748,979 A | 5/1998 | Trimberger | |
| 5,752,071 A | 5/1998 | Tubbs et al. | 395/800.34 |
| 5,758,176 A | 5/1998 | Agarwal et al. | 395/800 |
| 5,761,523 A | 6/1998 | Wilkinson et al. | 395/800.2 |
| 5,774,709 A | 6/1998 | Worrell | 712/233 |
| 5,778,241 A | 7/1998 | Bindloss et al. | 395/800.2 |
| 5,784,602 A | 7/1998 | Glass et al. | 395/561 |
| 5,790,827 A | 8/1998 | Leung | 712/216 |
| 5,793,661 A | 8/1998 | Dulong et al. | 364/750.5 |
| 5,809,294 A | 9/1998 | Ando | 712/233 |
| 5,812,147 A | 9/1998 | Van Hook et al. | 345/511 |
| 5,812,723 A | 9/1998 | Ohtsu et al. | 385/128 |
| 5,815,695 A | 9/1998 | James et al. | 712/220 |
| 5,815,723 A | 9/1998 | Wilkinson et al. | 395/800.2 |
| 5,822,606 A | 10/1998 | Morton | 395/800.16 |
| 5,838,984 A | 11/1998 | Nguyen et al. | 395/800.05 |
| 5,848,269 A | 12/1998 | Hara | 712/239 |
| 5,852,726 A | 12/1998 | Lin et al. | 712/200 |
| 5,864,703 A | 1/1999 | van Hook et al. | 395/800.22 |
| 5,867,682 A | 2/1999 | Witt et al. | 712/210 |
| 5,880,984 A | 3/1999 | Burchfiel et al. | 708/501 |
| 5,881,307 A | 3/1999 | Park et al. | 395/800.23 |
| 5,887,183 A * | 3/1999 | Agarwal et al. | 712/2 |
| 5,922,066 A * | 7/1999 | Cho et al. | 712/204 |
| 5,933,650 A * | 8/1999 | Van Hook et al. | 712/2 |
| 5,936,872 A | 8/1999 | Fischer et al. | 364/754.03 |
| 5,953,241 A | 9/1999 | Hansen et al. | 708/501 |
| 5,960,012 A | 9/1999 | Spracklen | 371/53 |
| 5,996,056 A | 11/1999 | Volkonsky | 712/1 |
| 6,006,316 A | 12/1999 | Dinkjian | 712/22 |
| 6,035,316 A | 3/2000 | Peleg et al. | 708/523 |
| 6,035,317 A | 3/2000 | Guy | |
| 6,058,465 A | 5/2000 | Nguyen | 712/7 |
| 6,065,115 A | 5/2000 | Sharangpani et al. | 712/235 |
| 6,067,615 A | 5/2000 | Upton | |
| 6,078,941 A | 6/2000 | Jiang et al. | |
| 6,088,783 A | 7/2000 | Morton | 712/22 |
| 6,128,726 A | 10/2000 | LeComec | |
| 6,141,421 A | 10/2000 | Takaragi et al. | |
| 6,154,834 A | 11/2000 | Neal et al. | |
| 6,233,597 B1 | 5/2001 | Tanoue et al. | |
| 6,266,758 B1 * | 7/2001 | Van Hook et al. | 712/2 |
| 6,349,318 B1 | 2/2002 | Vanstone et al. | |

OTHER PUBLICATIONS

Bier, J., "DSP16xxx Targets Communications Apps," *Microprocessor Report*, MicroDesign Resources, pp. 11–15 (Sep. 15, 1997).

Case, B., "Superscalar Techniques: SuperSPARC vs. 88110," *Microprocessor Report*, MicroDesign Resources, vol. 5, No. 22, pp. 1 and 6–11 (Dec. 4, 1991).

Diefendorff, K., "88410 Second Level Cache," *Microprocessor Forum*, Motorola Inc., 20 pages (Nov. 1991).

Diefendorff, K. and Allend, M., "Organization of the Motorola 88110: A Superscalar RISC Microprocessor," 12 pages, Source and date unknown.

Fiegel, C.P., "TI Introduces Four–Processor DSP Chip," *Microprocessor Report*, MicroDesign Resources, pp. 22–25 (Mar. 28, 1994).

Gwennap, L., "Digital, MIPS Add Multimedia Extensions," *Microprocessor Report*, MicroDesign Resources, vol. 10, No. 15, pp. 1–5 (Nov. 18, 1996).

Gwennap, L., "New Multimedia Chips to Enter the Fray," *Microprocessor Report*, MicroDesign Resources, vol. 10, No. 13, 1 page (Oct. 1996).

Hansen, C., "Architecture of a Broadband Mediaprocessor," COMPCON 96, IEE, pp. 1–8 (Feb. 25–29, 1996).

DSP56002 24–Bit Digital Signal Processor User's Manual, Motorola, Inc., 386 pages (1995). (Bates Nos. L07277–L07662).

Peleg, A. and Weiser, U., "MMX Technology Extension to the Intel Architecture," *IEEE Micro*, IEEE, pp. 42–50 (Aug. 1996).

QML–DSP/MCM and Die Courier, at ti.com/sc/docs/military/liter/ecour/dsp.htp, Texas Instruments, Inc., 7 pages (Jan. 996).

Turley, J. and Hakkarainen, H., "TI's New 'C6x DSP Screams at 1,600 MIPS," *Microprocessor Report*, MicroDesign Resources, pp. 14–17 (Feb. 17, 1997).

DSP56002 24–*Bit Digital Signal Processor Semiconductor Technical Data*, Motorola, Inc., 110 pages (1996). (Bates Nos. L07803–L07912).

A236 *Parallel Digital Signal Processor Chip Programmer's Reference Manual*, Oxford Micro Devices, Inc., 195 pages (1994), (Bates Nos. L11184–L11378).

Lee, R., "Accelerating Multimedia with Enhanced Microprocessors," *IEEE Micro, IEEE*, pp. 22–32 (Apr. 1995). (Bates Nos. L08566–L08576).

DSP56000 24–Bit Digital Signal Processor Family Manual, Motorola, Inc., 638 pages (1995). (Bates Nos. L08722–L09359).

*Microprocessor Devices Reliability Monitor Report*: Third Quarter 1997, Motorola, 8 pages (1997).

*Reliabitly Monitor Environmental Stress Data 3Q97*, Motorola, 4 pages (1997).

*Reliability and Quality Report* 3Q97, Motorola, 2 pages (1997).

*Microprocessor Devices Reliability Monitor Report*: Fourth Quarter 1997, Motorola, 10 pages (1997).

*Reliability and Quality Report* 4Q97, Motorola, 2 pages (1997).
"Hardware Implications of xmem as a st followed by a ld," *Motorola Semiconductor Engineering Bulletin*, Motorla, 5 pages (Sep. 1992).
601 First Silicon, at http://www.mot.com/SPS/PowerPC/library/press_releases/601_First_Silicon.html, Motorola, 2 pages (Oct. 1, 1992).
DSP56002/DSP56L002 24–*Bit Digital Signal Processor Motorola Semiconductor Product Information*, Motorola, Inc., 3 pages (1994). (Bates Nos. L07913–L07915).
MC88410UM/AD: MC88410 *Secondary Cache Controller User's Manual*, at http://www.mot-sps.com/lit/html/mc88410umad.html, Motorola, Inc., 1 page (Jan. 24, 1997).
AN1214: MC88110 64–*bit External Bus Interface to 16–bit EPROM*, at http://www.mot-sps.com/lit/html/an1214.html, Motorola, Inc., 1 page (Jan. 24, 1997).
TMS320C80 *Digital Signal Processor*, Texas Instruments Corp., p. 41 (Jul. 1994).
EB162: *Programming Tips* (MC88110), at http://www-.mot-sps.com/lit/html/eb162.html, Motorola, Inc., 1 page (Jan. 24, 1997).
MC88110/410DH/AD: MC88110/MC88410 *Designer's Handbook*, at http://www.mot-sps.com/lit/html/mc88110410dhad.html, Motorola, Inc., 1 page (Jan. 24, 1997).
MC88110UMAD: MC88110 *Second Generation RISC Microprocessor User's Manual*, at http://www.mot-sps.com/lit/html/mc88110umad.html, Motorola, Inc., 1 page (Jan. 24, 1997).
Weiss, R., *ARM Piccolo Mixes ARM RISC with DSP*, at http://ww.estd.com/Editorial/1996/11/Briefs/arm.html, 1 page, (Nov. 1996).
TMS320C1x/C2x/C2xx/C5x *Assembly Language Tools User's Guide*, Texas Instruments, 483 pages (Mar. 1995). (Bates Nos. L07916–L08398).
TMS320C5x *General–Purpose Applications User's Guide*, Texas Instruments, 167 pages (Jul. 1997). (Bates Nos. L08399–L08565).
El–Sharkawy, Mohamed, Ph.D., *Digital Signal Processing Applications with Motorola's DSP56002 Processor*, Prentice Hall PTR, pp. 43–124 (1996). (Bates Nos. L06519–L06601).

Killian, E., "MIPS Extensions for Digital Media," *Microprocessor Forum*, pp. 1–5 (Oct. 22–23, 1996).
"Interrupt Latency in the MC88110," *Motorola Semiconductor Engineering Bulletin*, Motorola, pp. 1, 2 and 4–9 (1992).
"Running the MC88110 in Lockstep," *Motorola Semiconductor Engineering Bulletin*, Motorola, 2 pages (1992).
Turley, J., "Siemens TriCore Revives CISC Techniques: New 32–Bit Design Emphasizes DSP Capability and Microcontroller Functions," *Microprocessor Report*, Microdesign Resources, pp. 13–16 (Nov. 17, 1997).
i860™ *Microprocessor Family Programmer's Reference Manual*, Intel Corporation, 79 pages (1992). (Bates Nos. L09361–L09439).
Piccolo–*The ARM Signal Processing Architecture*[online], undated [retrieved on Jun. 3, 2001] retrieved from the Internet: <URL http://www.calab.cs.pusan.ac.kr/Technical-Report/Advanced%20Computer%20Arch.../picolo.html>; pp. 1–12.
Gwennap, L., "UltraSparc Adds Multimedia Instructions," *Microprocessor Report*, MicroDesign Resources, vol. 8, No. 16, Dec. 5, 1994, pp. 1–3.
Gwennap, L., "Intel's MMX Speeds Multimedia," *Microprocessor Report*, MicroDesign Resources, vol. 10, No. 3, Mar. 5, 1996, pp. 1–6.
Heinrich, J., MIPS R4000 *Microprocessor User's Manual*, Second Edition, MIPS Technologies Inc., 1994, pp. 154–155, 157, 159, 161, 168, 170–171, B–9–10, B–13, B–17, B–19, B–21, B–23, B–27, B–38, B–40, and B–62.
*IEEE Standard for Binary Floating–Point Arithmetic*, IEEE, 1985, pp.i–vi and 1–14.
TMS32010 *User's Guide*, Texas Instruments Incorporated, 1983, p. 1183.
VIS™ *Instruction Set User's Manual*, Sun Microsystems, Inc., 1997, pp. i–xii and 1–136, nondot.org/sabre/os/files/processors/VISInstructionSetUsersManual.pdf.
IBM Technical Disclosure Bulletin, *Pipelined Hardware Multiplier with Extended Precision*, vol. 23, Issue No. 9, pp. 4322–4323, Feb. 1981 (5 pages submitted).

* cited by examiner

| 63 | | | | | | | 0 | |
|---|---|---|---|---|---|---|---|---|
| vd[7] | vd[6] | vd[5] | vd[4] | vd[3] | vd[2] | vd[1] | vd[0] | ~702 |
| 0 | vs[7] | 0 | vs[6] | 0 | vs[5] | 0 | vs[4] | ~704 |
| 0 | vs[3] | 0 | vs[2] | 0 | vs[1] | 0 | vs[0] | ~706 |
| sign vs[7] | vs[7] | sign vs[6] | vs[6] | sign vs[5] | vs[5] | sign vs[4] | vs[4] | ~708 |
| sign vs[3] | vs[3] | sign vs[2] | vs[2] | sign vs[1] | vs[1] | sign vs[0] | vs[0] | ~710 |
| vs[7] | vs[5] | vs[3] | vs[1] | vt[7] | vt[5] | vt[3] | vt[1] | ~712 |
| vs[6] | vs[4] | vs[2] | vs[0] | vt[6] | vt[4] | vt[2] | vt[0] | ~714 |
| vs[7] | vt[7] | vs[6] | vt[6] | vs[5] | vt[5] | vs[4] | vt[4] | ~716 |
| vs[3] | vt[3] | vs[2] | vt[2] | vs[1] | vt[1] | vs[0] | vt[0] | ~718 |

FIG. 7

| 63 | | | | 0 | |
|---|---|---|---|---|---|
| vd[3] | vd[2] | vd[1] | vd[0] | | ~902 |
| vs[3] | vt[3] | vs[2] | vt[2] | | ~904 |
| vs[1] | vt[1] | vs[0] | vt[0] | | ~906 |
| vs[3] | vs[1] | vt[3] | vt[1] | | ~908 |
| vs[2] | vs[0] | vt[2] | vt[0] | | ~910 |
| vs[2] | vt[3] | vs[0] | vt[1] | | ~912 |
| vs[0] | vt[1] | vs[2] | vt[3] | | ~914 |
| vs[3] | vs[2] | vt[3] | vt[2] | | ~916 |
| vs[1] | vs[0] | vt[1] | vt[0] | | ~918 |

FIG. 9

ALIGNMENT AND ORDERING OF VECTOR ELEMENTS FOR SINGLE INSTRUCTION MULTIPLE DATA PROCESSING

CROSS-REFERENCE TO RELATED APPLICATIONS

This application is a continuation of U.S. patent application Ser. No. 09/263,798, filed Mar. 5, 1999, now U.S. Pat. No. 6,266,758 B1, issued Jul. 24, 2001, which is a continuation of U.S. patent application No. 08/947,649, filed Oct. 9, 1997, now U.S. Pat. No. 5,933,650, issued Aug. 3, 1999.

FIELD OF THE INVENTION

The present invention relates to the field of single instruction multiple data vector (SIMD) processing. More particularly, the present claimed invention relates to alignment and ordering vector elements for SIMD processing.

The present invention provides alignment and ordering of vector elements for SIMD processing. The present invention is implemented in a computer system including a processor having a plurality of register. In one embodiment, in the generation of an aligned vector of first width from two second width vectors for SIMD processing, one vector is loaded from a memory unit into a first register and another vector is loaded from the memory unit into a second register. The first vector contains a first byte of the aligned vector to be generated. Then, a starting byte specifying the first byte of the aligned vector is determined. Next, the aligned vector is extrated from the first register and the second register beginning from the first bit in the starting byte of the first register continuing through the bits in the second register. Finally, the aligned vector is replicated into a third register such that the third register contains a plurality of elements aligned for SIMD processing.

BACKGROUND ART

Today, most processors in microcomputer systems provide a 64-bit wide datapath architecture. The 64-bit datapath allows operations such as read, write, add, subtract, and multiply on the entire 64 bits of data at once. However, for many applications the types of data involved simply do not require the full 64 bits. In media signal processing (MDMX) applications, for example, the light and sound values are usually represented in 8, 12, 16, or 24 bit numbers. This is because people typically are not able to distinguish the levels of light and sound beyond the levels represented by these numbers of bits. Hence, data types in MDMX applications typically require less than the full 64 bits provided in the datapath in most computer systems.

To efficiently utilize the entire datapath, the current generation of processors typically utilizes a single instruction multiple data (SIMD) method. According to this method, a multitude of smaller numbers are packed into the 64 bit doubleword as elements, each of which is then operated on independently and in parallel. Prior Art FIG. 1 illustrates an exemplary single instruction multiple data (SIMD) method. Registers, vs and vt, in a processor are of 64-bit width. Each register is packed with four 16-bit data elements fetched from memory: register vs contains vs[0], vs[1], vs [2], and s[3] and register vt contains vt[0], vt[1], vt[2], and vt[3]. The registers in essence contain a vector of N elements. To add elements of matching index, an add instruction adds, independently, each of the element pairs of matching index from vs and vt. A third register, vd, of 64-bit width may be used to store the result. For example, vs[0] is added to vt[0] and its result is stored into vd [0]. Similarly, vd[1], vd[2], and vd[3] store the sum of vs and vd elements of corresponding indexes. Hence, a single add operation on the 64-bit vector results in 4 simultaneous additions on each of the 16-bit elements. On the other hand, if 8-bit elements were packed into the registers, one add operation performs 8 independent additions in parallel. Consequently, when a SIMD arithmetic instruction such as addition, subtraction, or multiply, is performed on the data in the 64-bit datapath, the operation actually performs multiple numbers of operations independently and in parallel on each of the smaller elements comprising the 64 bit datapath. In SIMD vector operation, processors typically require alignment to the data type size of 64-bit doubleword on a load. This alignment ensures that the SIMD vector operations occur on aligned boundaries of a 64-bit doubleword boundary.

Unfortunately, the elements within application data vectors are frequently not 64-bit doubleword aligned for SIMD operations. For example, data elements stored in a memory unit are loaded into registers in a chunk such as a 64-bit doubleword format. To operate on the individual elements, the elements are loaded into a register. The order of the elements in the register remain the same as the order in the original memory. Accordingly, the elements may not be properly aligned for a SIMD operation.

Traditionally, when elements are not aligned with a proper boundary as required for a SIMD vector operation, the non-aligned vector processing have typically been reduced to scalar processing. That is, operations took place one element at a time instead of simultaneous multiple operations. Consequently, SIMD vector operations lost parallelism and performance advantages when the vector elements were not properly aligned.

Furthermore, many media applications require a specific ordering for the elements within a SIMD vector. Since elements necessary for SIMD processing are commonly stored in multiple 64-bit doublewords with other elements, these elements need to be selected and assembled into a vector of desired order. For example, multiple channel data are commonly stored in separate arrays or interleaved in a single array. Processing the data requires interleaving or deinterleaving the multiple channels. Other applications require SIMD vector operations on transposed 2 dimensional arrays of data. Yet other applications reverse the order of elements in an array as in FFTs, DCTs, and convolution algorithms.

Thus, what is needed is a method for aligning and ordering elements for more efficient SIMD vector operations by providing computational parallelism.

SUMMARY OF THE INVENTION

The present invention provides alignment and ordering of vector elements for SIMD processing. The present invention is implemented in a computer system including a processor having a plurality of registers. In the alignment of vector elements for SIMD processing, one vector is loaded from a memory unit into a first register and another vector is loaded from the memory unit into a second register. The first vector contains a first byte of an aligned vector to be generated. Then, a starting byte specifying the first byte of an aligned vector is determined. Next, a vector is extracted from the first register and the second register beginning from the first bit in the first byte of the first register continuing through the bits in the second register. Finally, the extracted vector is replicated into a third register such that the third register contains a plurality of elements aligned for SIMD processing. In the ordering of vector elements for SIMD processing, a first vector is loaded from a memory unit into a first register and a second vector is loaded from the memory unit into a second register. Then, a subset of elements is selected from the first register and the second register. The elements from the subset are then replicated into the elements in the third register in a particular order suitable for subsequent SIMD vector processing.

BRIEF DESCRIPTION OF THE DRAWINGS

The accompanying drawings, which are incorporated in and form a part of this specification, illustrate embodiments of the invention and, together with the description, serve to explain the principles of the invention:

Prior Art

FIG. 7 illustrates shuffle operations for ordering 8-bit elements in a 64-bit doubleword.

FIG. 9 illustrates shuffle operations for ordering 16-bit elements in a 64-bit doubleword.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

The present invention, a method for providing alignment and ordering of vector elements for single-instruction multiple-data (SIMD) processing, is described. The preferred embodiment of the present invention provides elements aligned and ordered for an efficient SIMD vector operation in a processor having 64-bit wide datapath within an exemplary computer system described below. Although such a datapath is exemplified herein, the present invention can be readily adapted to suit other datapaths of varying widths.

COMPUTER SYSTEM ENVIRONMENT

Figure 1:
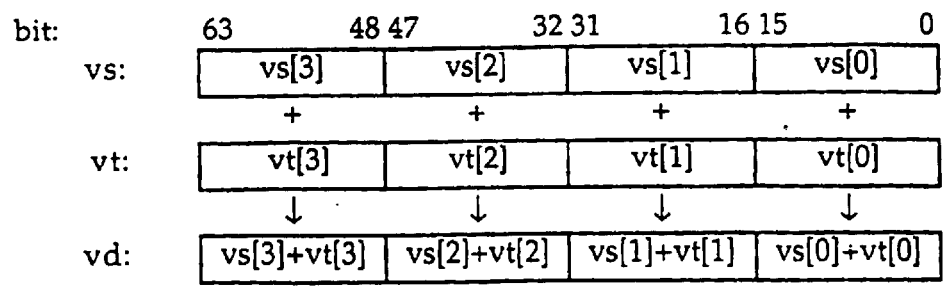
FIG. 1 illustrates an exemplary single instruction multiple data (SIMD) instruction method.
Figure 2:
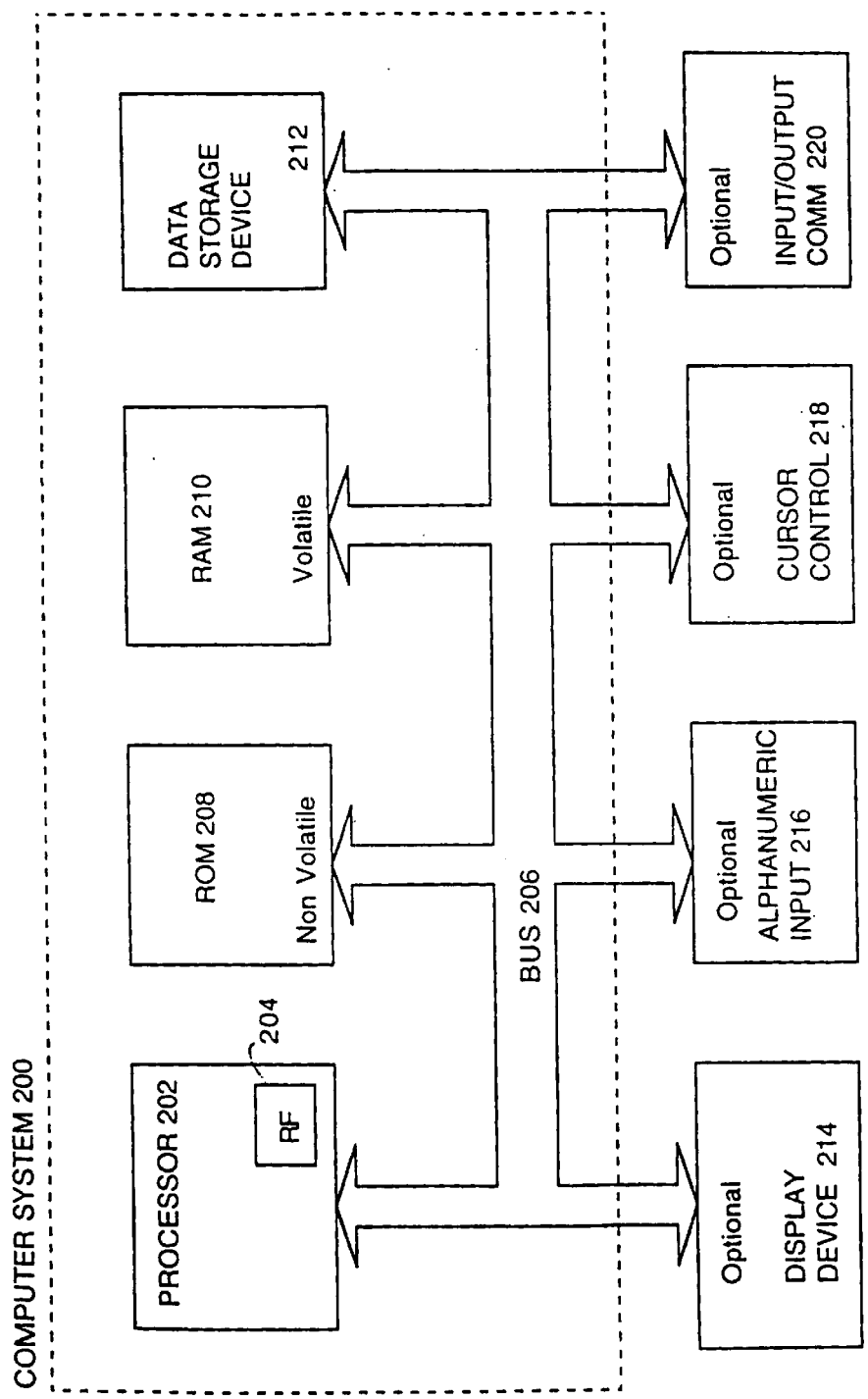
FIG. 2 illustrates a block diagram of an exemplary computer system for implementing the present invention.

FIG. 2 illustrates an exemplary computer system 200 comprised of a system bus 206 for communicating information, a processor 202 coupled with the bus 206 for processing information and instructions, a computer readable volatile memory unit 210 (e.g., random access memory, static RAM, dynamic RAM, etc.) coupled with the bus 206 for storing information and instructions for the processor 202, a computer readable non-volatile memory unit 208 (e.g., read only memory, programmable ROM, flash memory, EPROM, EEPROM, etc.) coupled with the bus 206 for storing static information and instructions for the processor 202. A vector register file 204 containing a plurality of registers is included in the processor 202. In the present invention, the term vector register file 204 encompasses any register file containing a plurality of registers and as such is not limited to vector register files.

The computer system 200 of FIG. 2 further includes a mass storage computer readable data storage device 212 (hard drive, floppy, CD-ROM, optical drive, etc.) such as a magnetic or optical disk and disk drive coupled with the bus 206 for storing information and instructions. Optionally, the computer system 200 may include a display device 214 coupled to the bus 206 for displaying information to the user, an alphanumeric input device 216 including alphanumeric and function keys coupled to the bus 206 for communicating information and command selections to the processor 202, a cursor control device 218 coupled to the bus 206 for communicating user input information and command selections to the processor 202, and a signal generating device 220 coupled to the bus 206 for communicating command selections to the processor 202.

According to an exemplary embodiment of the present invention, the processor 202 includes a SIMD vector unit that functions as a coprocessor for or as an extension of the processor 202 The SIMD vector unit performs various arithmetic and logical operations on each data element within a SIMD vector in parallel. The SIMD vector unit utilizes the register files of the processor 202 to hold SIMD vectors. The present invention may include one or more SIMD vector units to perform specialized operations such as arithmetic operations, logical operations, etc.

Figure 3:
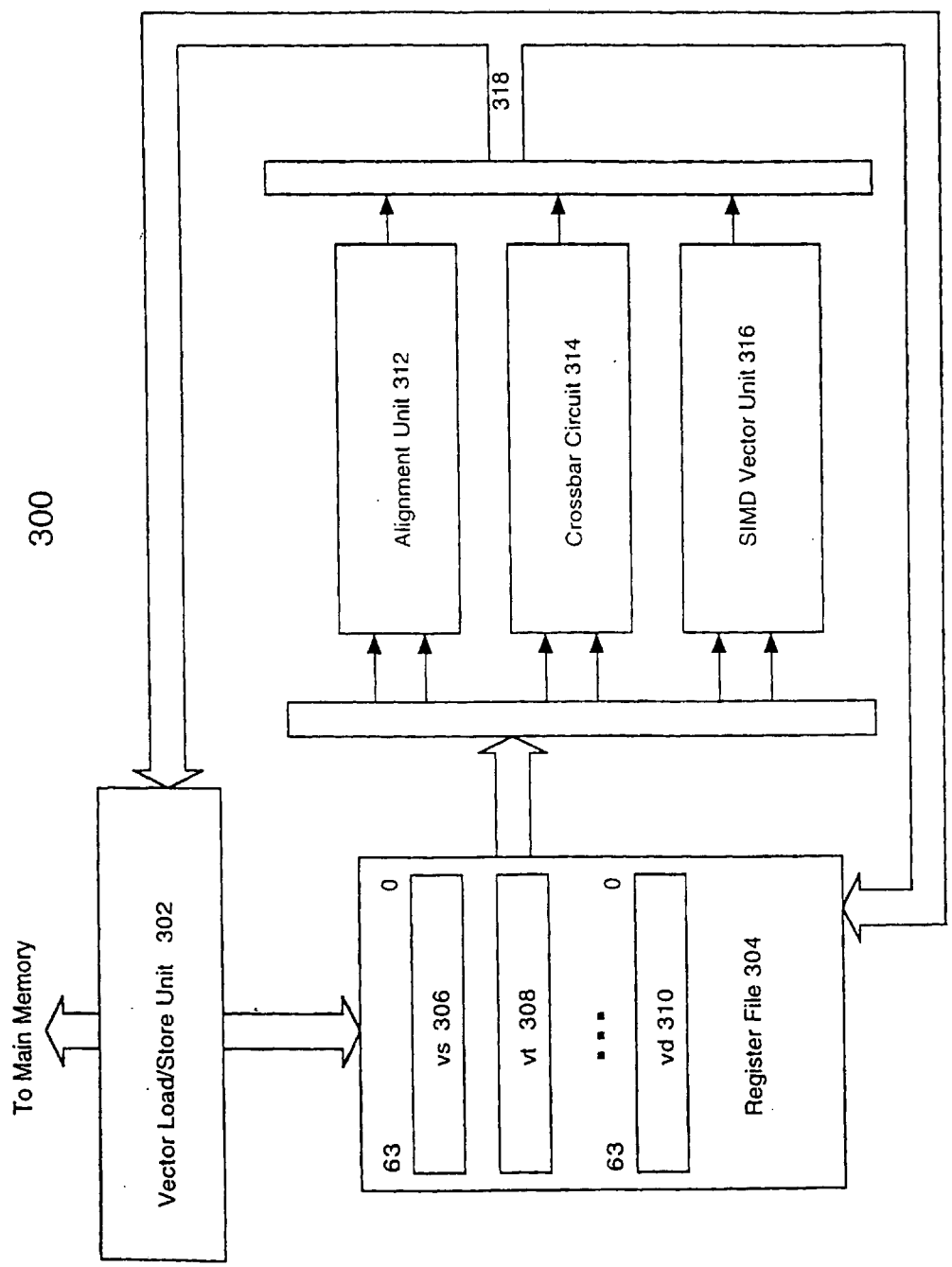
FIG. 3 illustrates a block diagram of an exemplary datapath for aligning and ordering vector elements.

FIG. 3 illustrates a block diagram of an exemplary datapath 300 for aligning and ordering vector elements. The datapath 300 includes a SIMD vector unit 302, an alignment unit 322, a register file 304, a crossbar circuit 314, and a vector load/store unit 302. The vector load/store unit 302 performs load and store functions. It loads a vector from memory into one of the registers in the register file 304. It also stores a vector from one of the registers in the register file 304 into main memory. The alignment unit 312 receives two vectors from two source registers such as vs 306 and vt 308. Then, the alignment unit 312 extracts an aligned vector from the two vectors and stores it into a destination register such as vd 310. The crossbar circuit 314 also receives two vectors two exemplary source registers, vs 306 and vt 308. The crossbar circuit 314 then selects a set of elements from the source registers and routes each of the elements in the selected set to a specified element in the exemplary destination register, vd 310. In an alternative embodiment, the crossbar circuit 314 may receive one vector from a single source register and select a set of elements from the vector. The data path 318 allows a result to be forwarded to the register file 304 or to the vector load/store unit to be stored into main memory.

The SIMD vector unit 302 represents a generic SIMD vector processing unit, which may be an arithmetic unit, logical unit, integer unit, etc. The SIMD vector unit 302 may receive either one or two vectors from one or two source registers. It should be appreciated that the present invention may include more than one SIMD vector unit performing various functions. The SIMD vector unit 302 may execute an operation specified in the instruction on each element within a vector in parallel.

The exemplary vector register file 304 is preferably comprised of 32 64-bit general purpose registers. To this end, the preferred embodiment of the present invention utilizes the floating point registers (FGR) of a floating point unit (FPU) in the processor as its vector registers. In this shared arrangement, data is moved between the vector register file 304 and a memory unit through the vector load/store unit 302. These load and store operations are unformatted. That is, no format conversions are performed and therefore no floating-point exceptions can occur due to these operations. Similarly, data is moved between the vector register file 304 and the alignment unit 312, the crossbar circuit 314, or the SIMD vector unit 316 without format conversions, and thus no floating-point exception occurs.

The present invention allows data types of 8-, 16-bit, 32-, or 64-bit fields. Hence, a 64-bit doubleword vector may contain 8 8-bit elements, 4 16-bit elements, 2 32-bit elements, or 1 64-bit element. According to this convention, vector registers of the present invention are interpreted in the following data formats: Quad Half (QH), Oct Byte (OB), Bi word (BW), and Long (L). In QH format, a vector register is interpreted as having 16-bit elements. For example, a 64-bit vector register is interpreted as a vector of 4 signed 16-bit integers. OB format interprets a vector register as being comprised of 8-bit elements. Hence, an exemplary 64-bit vector register is seen as a vector of 8 unsigned 8-bit integers. In BW format, a vector register is interpreted as having 2 32-bit elements. L format interprets a vector register as having a 64-bit element. These data types are provided to be adaptable to various register sizes of a processor. As described above, data format conversion is not necessary between these formats and floating-point format.

According to a preferred embodiment of the present invention, exemplary source registers, vs and vt, are each used to hold a set of vector elements. A third exemplary vector register, vd, is created from the source registers and holds a set of elements selected from the source registers. Although the registers, vs, vt, and vd, are used to associate vector registers with a set of vector elements, other vector registers are equally suitable for present invention.

LOAD/STORE INSTRUCTIONS

The load and store instructions of the present invention use a special load/store unit to load and store a 64-bit doubleword between a register in a register file such as an FPR and a memory unit. The doubleword is loaded through an exemplary load/store unit 302 illustrated above in FIG. 3. The load/store unit performs loading or storing of a doubleword with upper 61 bits of an effective address. The lowest 3 bits specify a byte address within the 64-bit doubleword for alignment.

According to a preferred embodiment, an effective address is formed by adding the contents of an index value in a general purpose register (GPR) to a base address in another GPR. The effective address is doubleword aligned. During the loading process, the last three bits of the effective address are ignored by treating these bits as 0s. Hence, the effective address is comprised of bits 3 to 63. The three bits from 0 to 2 contain the byte address for accessing individual bytes within a doubleword and are ignored by treating the three bits as 0s. If the size of a register in a register file is 64-bits, then the 64-bit data stored in memory at the effective address is fetched and loaded into the register. If on the other hand, the size of the register in the register file is 32-bits, then the lower 32 bits of the data are loaded into the vector register and the upper 32 bits of the data are loaded into the next register in sequence. Hence, a pair of 32-bit registers are used to hold a 64-bit data from the memory.

Conversely, the store instruction stores a doubleword from a vector register such as an FPR to the memory while ignoring alignment. The store operation is carried out through the exemplary load/store unit 302 illustrated above in FIG. 3. The contents of a 64-bit doubleword in FPR, fs, is stored at the memory location specified by the effective address. The contents of GPR index and GPR base are added to form the effective address. The effective address is doubleword aligned. The last three bits of the effective address are ignored.

The effective address is formed by adding the contents of an index value in a general purpose register (GPR) to a base address in another GPR while ignoring the lowest three bits of the effective address by interpreting them as 0s. That is, the effective address is comprised of bits 3 to 63. The ignored three bits contain the byte address for accessing individual bytes within a doubleword. If the size of a vector register is 64-bits, then the content of the vector register is stored into memory. If on the other hand, the size of a vector register is 32-bits, then the lower 32 bits of the data are concatenated with the upper 32 bits of the data contained in the next register in sequence. Then, the concatenated 64-bit doubleword is stored into memory at the address specified by the effective address.

ALIGNMENT INSTRUCTION

The present alignment instruction operates on two 64-bit doublewords loaded into two registers from memory by issuing two load instructions. One doubleword is loaded into a first register (vs) and the other doubleword is loaded into a second register (vt). The alignment instruction generates a 64-bit doubleword vector in a third register (vd) aligned for a SIMD vector operation. I Preferably, an alignment unit performs alignment of a vector by funnel shift to extract an aligned 64-bit vector of elements from the two 64-bit registers.

Figure 4:
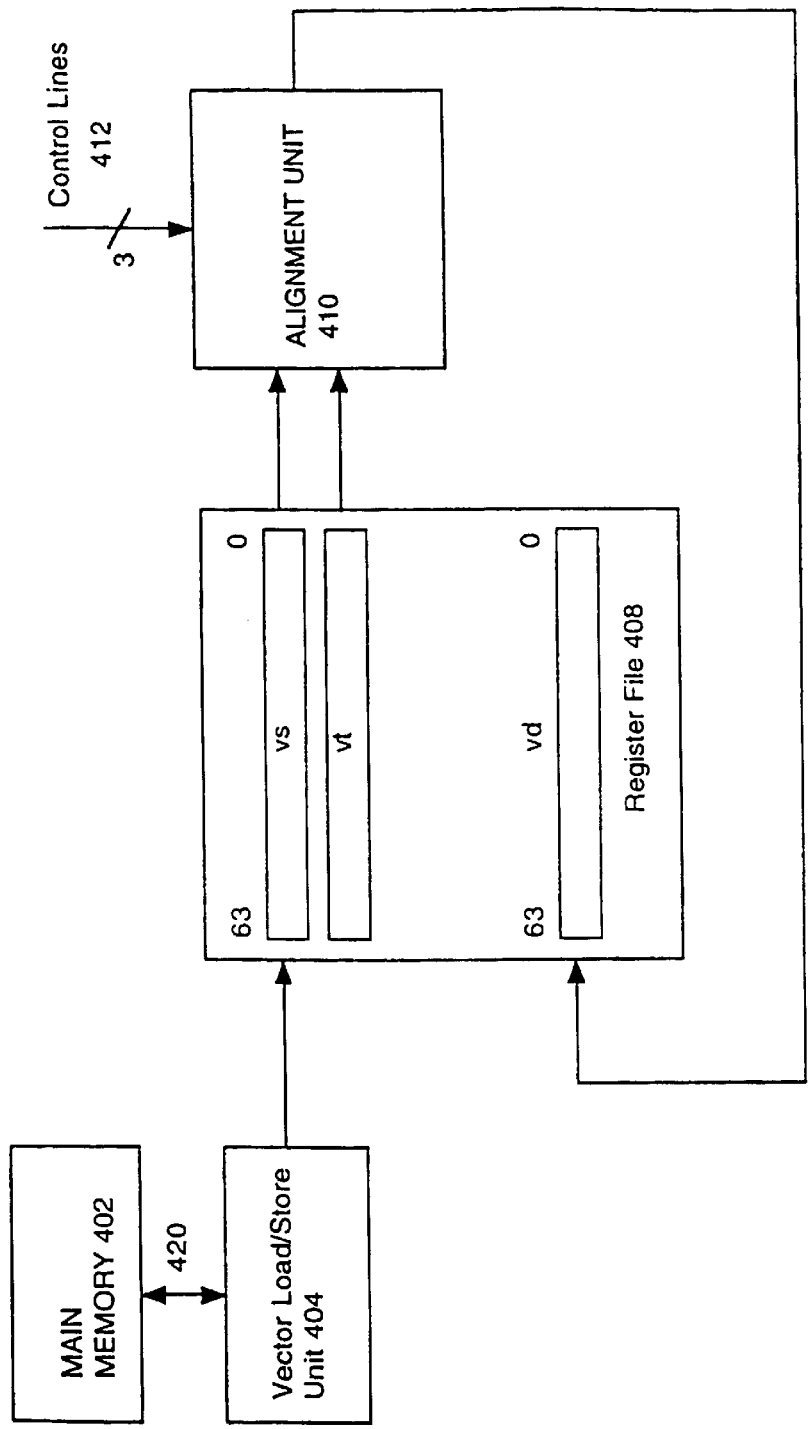
FIG. 4 illustrates a block diagram of an alignment unit in a processor for aligning a vector of elements.

FIG. 4 illustrates a block diagram of an alignment unit in a processor for aligning a vector of elements. The vector load/store unit 404 loads two vectors from main memory 402 into two vector registers, vs and vt, in a register file 408. The alignment unit 410 receives the two vectors in the vector registers, vs and vt, and extracts a byte aligned vector. Three control lines 412 representing three bits for the byte address controls the byte alignment performed through the alignment unit 410. The aligned vector is then forwarded to an exemplary vector register, vd, in the register file.

The alignment of a vector is dependent on a byte ordering mode of a processor. Byte ordering within a larger data size such as a 64-bit doubleword may be configured in either big-endian or little-endian order. Endian order refers to the location of byte 0 within a multi-byte data. A processor according to the present invention may be configured as either a big-endian or little-endian system. For example, in a little-endian system, byte 0 is the least significant (i.e., rightmost) byte. On the other hand, in a big-endian system, byte 0 is the most significant (i.e., leftmost) byte. In the present invention, an exemplary processor uses byte addressing for a doubleword access, which is aligned on a byte boundary divisible by eight (i.e., 0, 8, 16, . . . , 56). Hence, a 64-bit doubleword loaded into a register in a processor is byte-aligned in either a big-endian or a little-endian mode. For a little-endian mode processor, the starting (i.e., first) byte for a vector to be extracted lies in the second vector register. Conversely for a big-endian mode processor, the starting (i.e., first) byte for the vector resides in the first vector register.

Figure 5:
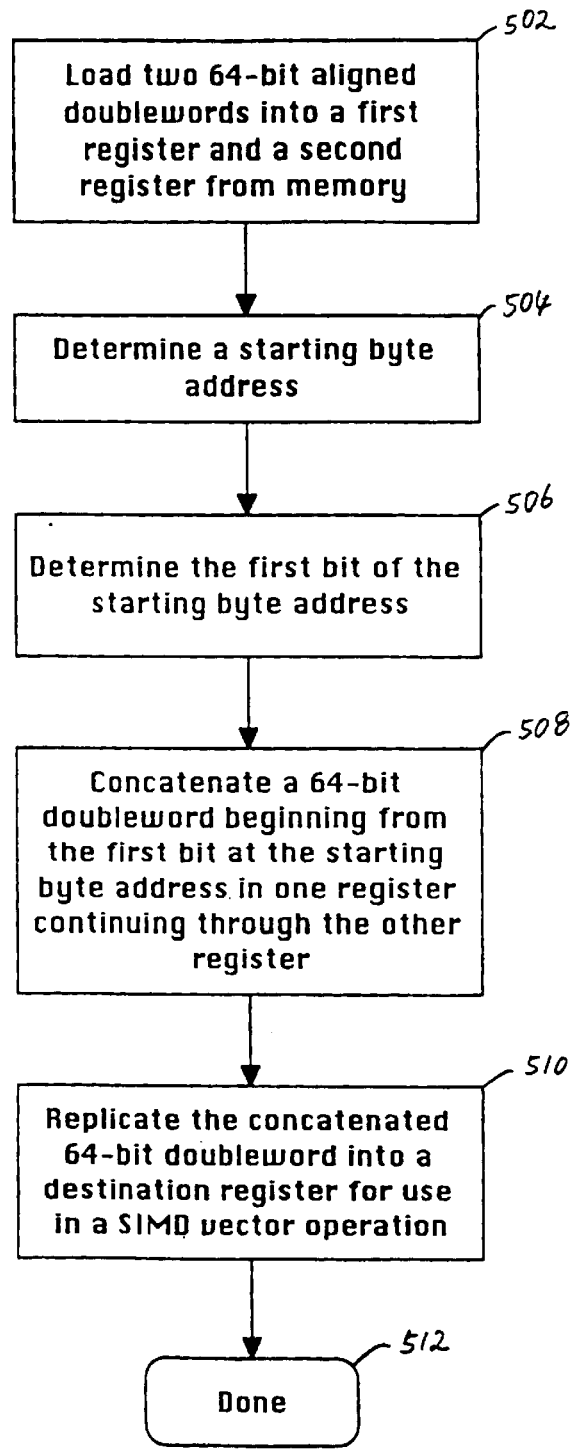
FIG. 5 illustrates a flow diagram of the steps involved in extracting an aligned vector from two exemplary vectors.

FIG. 5 illustrates a flow diagram of the steps involved in extracting an aligned vector from two exemplary vectors. In step 502, two 64-bit doublewords are loaded from a memory unit into two 64-bit registers. One 64-bit doubleword is loaded into a first register and the other 64-bit doubleword in memory is loaded into the second register. Preferably, the former doubleword and the next doubleword are stored in contiguous memory space and their starting addresses differ by 64-bits or 8 bytes. The loading of the doublewords are accomplished through a load/store unit according to the load instruction described above.

The starting byte address of the aligned vector to be extracted is then determined in step 704. According to the preferred embodiment, the register and vector are all 64-bit wide. Since a 64-bit doubleword contains 8 bytes, three bits are needed to specify all the byte positions in a 64-bit doubleword. Hence, the preferred embodiment uses 3 bits to specify the position of the starting byte address in a 64-bit vector.

In one embodiment of the present invention, an alignment instruction provides an immediate, which is a constant byte address within a doubleword. Preferably, the immediate consists of 3 bits for specifying a constant byte address to a byte among 8 bytes each in the first register (i.e., little-endian mode processor) and the second register (i.e., big-endian mode processor). This alignment instruction performs a constant alignment of a vector. The align amount is computed by masking the immediate, then using that value to control a funnel shift of vector vs concatenated with vector vt. The operands can be in the QH, OB, or BW format.

In an alternative embodiment, the alignment instruction provides a variable byte addressing by specifying an address of a general purpose register (GPR) containing the starting byte address in the first register. This instruction accesses the GPR by using the address provided in the alignment instruction. Then, the instruction extracts the lower 3 bits in the GPR to obtain the starting byte address in the first register (i.e., little-endian mode) or the second register (i.e., big-endian mode). The align amount is computed by masking the contents of GPR, rs, then using that value to control a funnel shift of vector vs concatenated with vector vt. The operands can be in QH, OB, or BW format.

After determining the starting byte address in step 504 of the flowchart in FIG. 5, the first bit of the starting byte address is determined in step 506 by multiplying the starting byte address by 8. For example, if the starting byte address were 3, the first bit of the starting byte address is 3*8 or 24. Then in step 508, a 64-bit doubleword is extracted by concatenating from the first bit at the starting byte address in one register continuing through the other register. This concatenation is accomplished by funnel shifting from the first bit of the starting byte. Specifically, the first register is assigned bit positions from 0 to 63. The second register is assigned the next 64 bit positions from 64 to 127. The extraction scheme depends on the byte ordering modes. A variable s, representing the first bit position at the starting byte address, can be used to simplify the illustration of the differences between the byte ordering modes. In a big-endian byte mode, the concatenation occurs from bit position 127-s to 64-s. Conversely, in a little-endian bye mode, the concatenation occurs from bit position s through 63+s.

Then in step 510, the extracted vector is replicated into a destination register in the register file for SIMD vector processing. In an alternative, embodiment, the extracted vector may be stored into the memory unit for later use. The process then terminates in step 512.

SHUFFLE INSTRUCTION

The shuffle instruction according to the present invention provides a vector of ordered elements selected from either one or two other vector registers. One or more load/store instructions are used to load the vector(s) into registers for shuffle operation. One embodiment uses a full byte-mode crossbar to generate a vector of elements selected from the elements of two other exemplary vectors. That is, selected elements of the exemplary vectors, vs and vt, are merged into a new exemplary vector, vd. The new vector, vd, contains elements aligned for SIMD operation. Alternatively, a plurality of shuffle operations may be carried out to arrange the elements in a desired order for SIMD vector processing.

Figure 6A:
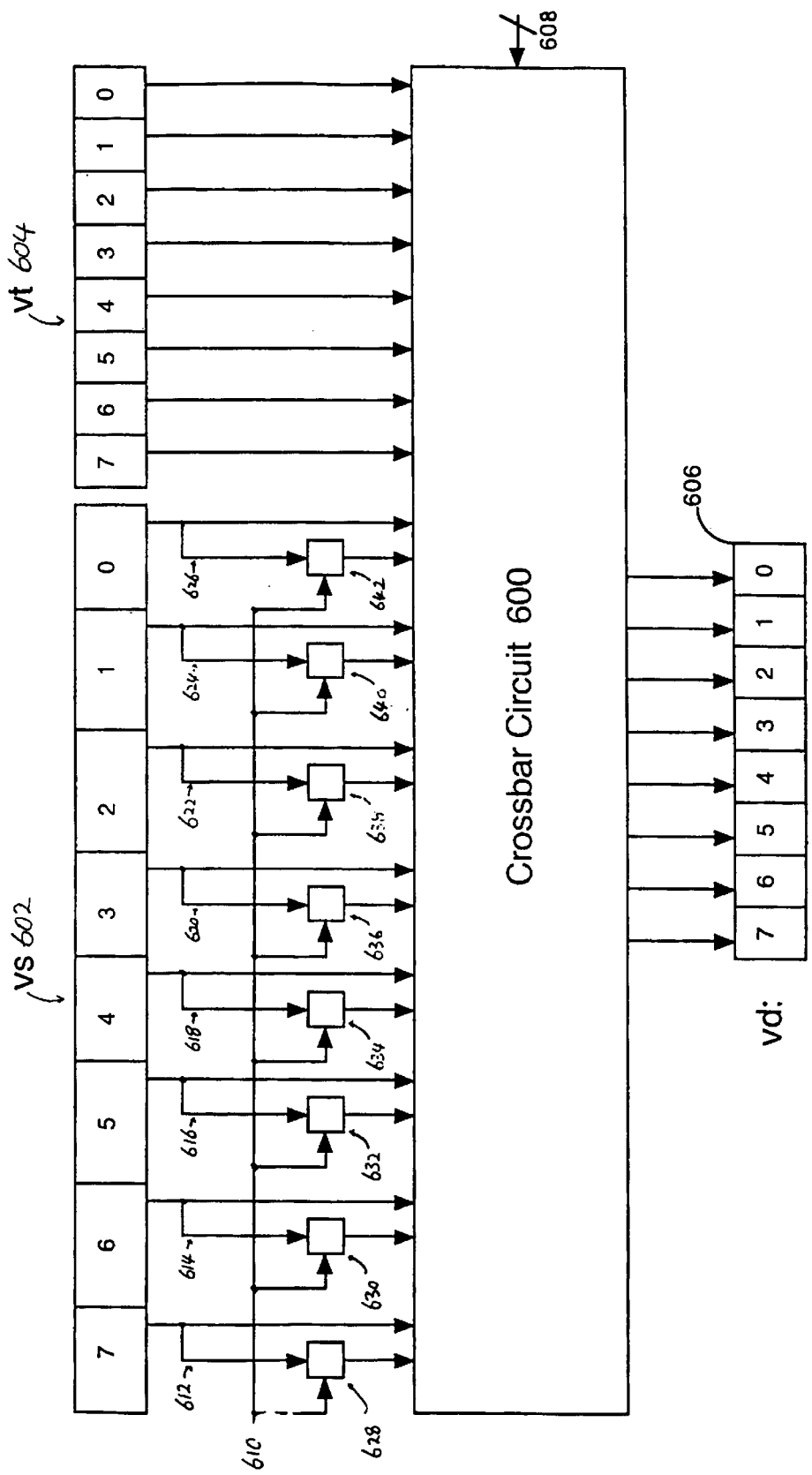
FIG. 6A illustrates a block diagram of a full byte-mode crossbar circuit used in generating a vector of elements from elements of two vector registers.

FIG. 6A illustrates a block diagram of a full byte-mode crossbar circuit 600 used in generating a vector of elements from elements of two registers. First, two vectors from a memory unit are loaded into two exemplary registers in a processor; the elements of the first vector are loaded into the first register, vs 602, and the elements of the second vector are loaded into the second register, vt 604. The elements of these two vector registers, vs 602 and vt 604, serve as source elements. The crossbar circuit 600 receives as input each of the elements from the two vector registers in parallel. A set of control lines 608 is coupled to the crossbar circuit 600 to relay a specific shuffle instruction operation. The shuffle instruction operation encodes a destination element for each of the selected source elements. In response to the specific shuffle instruction operation signals, the crossbar circuit 600 selects a set of elements from the two registers, vs 602 and vt 604, and routes or replicates each element to its associated destination element in an exemplary destination register, vd 606.

In addition, the present invention allows zeroing and sign extension of elements. For example with reference to FIG. 6A, the present invention provides either zeroing or sign extension for each element in the first register, vs 602. In addition to providing the entire bits to the crossbar circuit 600, elements 0 through 7 in the first register, vs 602, provides their corresponding sign bits 612, 614, 616, 618, 620, 622, 624, and 626 (612 through 626) to the associated AND gates 628, 630, 632, 634, 636, 638, 640, and 642 (628 through 642). Each of the AND gates 628 through 642 also receives as the other input, a control signal 610, which originate from a specific shuffle instruction for specifying either zeroing or sign extension mode.

Figure 6B:
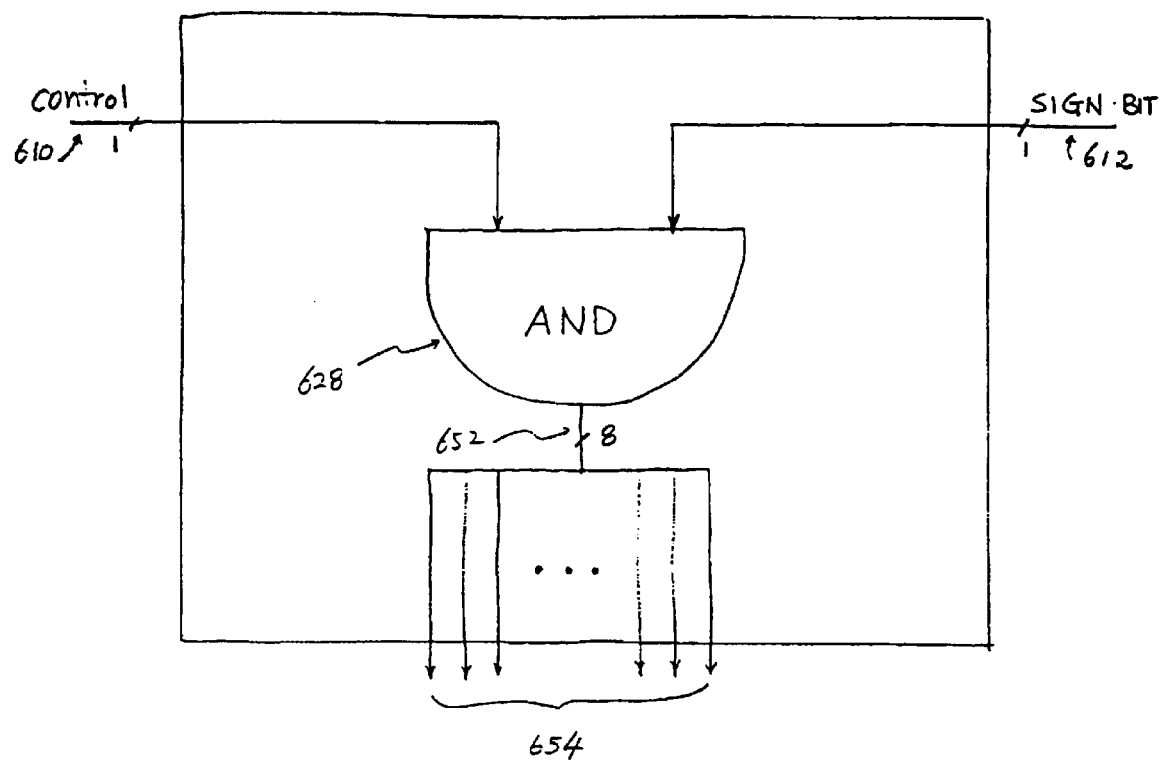
FIG. 6B shows a more detailed diagram of the operation of an exemplary AND gate associated with element 7 in the first register, vs.

FIG. 6B shows a more detailed diagram of the operation of the exemplary AND gate 628 associated with element 7 in the first register, vs 602. The AND gate 628 receives a single sign bit 612 from the most significant bit in the element 7 of the first register, vs 602. The AND gate 628 also receives the control signal 610. To provide zeroing for element 7 for example, the control signal 610 inputs a 0 into the AND gate 628. In this case, the output 652 at the AND gate 628 is 0 no matter what the input is at the sign bit 612. On the other hand, when the control signal is 1, the AND gate 628 generates the sign bit 612 as the output 652, whatever the sign is. In both cases of zeroing and sign extension, the output 652 is routed to a plurality of output lines 654 for replicating the output signal into an appropriate width. Preferably, the output lines 654 matches the number of bits in each element in the first register, vs 602. The crossbar circuit 600 accepts the signals on these output lines 652 and uses these signals to zero or sign extend element 7 when necessary according to a shuffle instruction. The AND gates for the other elements 0 to 6 operate in a similar manner to provide zeroing and sign extension bit signals to the crossbar circuit 600.

The preferred embodiment of the present invention operates on vectors of elements in a preferred OB or QH mode. In an OB mode, a 64-bit doubleword vector is interpreted as having 8 8-bit elements. In a QH mode, the 64-bit vector is treated as containing 4 16-bit elements. For example, in OB mode, the crossbar circuit 600 selects, in parallel, as source elements eight 8-bit elements among the elements in the registers vs 602 and vt 604. Each of the eight elements is then replicated or routed into a particular destination element in the destination vector register, vd 606. In QH mode, the crossbar circuit selects four 16-bit elements and replicates or routes each element into a particular destination element in the destination register. Those skilled in the art will appreciate that the crossbar circuit represents one embodiment of the present invention in implementing the shuffle instruction operations. A crossbar circuit is well known the art and is commonly used in conjunction with vector processing units.

FIG. 7 illustrates shuffle operations for ordering 8-bit elements in a 64-bit doubleword. Each row represents the destination vector register, vd, comprised of 8 elements, vd[0] to vd[7]. The first row 702 is comprised of placeholders to indicate the 8 elements. Below the first row 702 are 8 different shuffle operations in OB mode as indicated by the content of destination vector register, vd, for each row 704 to 718. These shuffle operations in OB mode are illustrated in FIGS. 8A through 8H.

Figure 8A:
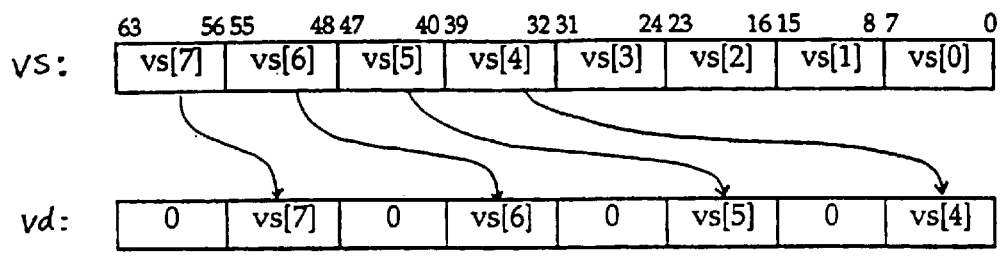
FIG. 8A illustrates a block diagram of a shuffle operation, which converts four unsigned upper bytes (i.e., 8 bits) in a source register to four 16-bit halves in a destination register.

FIG. 8A illustrates a block diagram of a shuffle operation, which converts four unsigned upper bytes (i.e., 8 bits) in a source register to four 16-bit halves in a destination register. This shuffle operation, represented by mnemonic UPUH.OB, selects the upper 4 8-bit elements in an exemplary vector register, vs. The selected elements vs[4], vs[5], vs[6], and vs[7] are replicated into destination elements vd[0], vd[2], vd[4], and vd[6], respectively. The odd elements of the destination vector register vd[1], vd[3], vd[5], and vd[7] are zeroed.

Figure 8B:
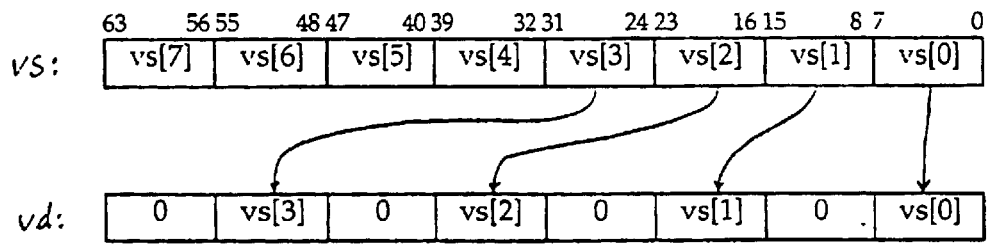
FIG. 8B illustrates a block diagram of a shuffle operation, which converts a vector of unsigned low 4 bytes from a source register to four 16-bit halves in a destination register.

FIG. 8B illustrates a block diagram of a shuffle operation, which converts a vector of unsigned low 4 bytes in a register to 16-bit halves. This shuffle operation, represented by mnemonic UPUL.OB, selects the lower 4 8-bit elements in an exemplary vector register, vs. The selected elements vs[0], vs[1], vs [2], and vs[3] are replicated into destination elements vd[0], vd[2], vd[4], and vd[6], respectively. The odd elements of the destination vector register vd[1], vd[3], vd[5], and vd[7] are zeroed.

Figure 8C:
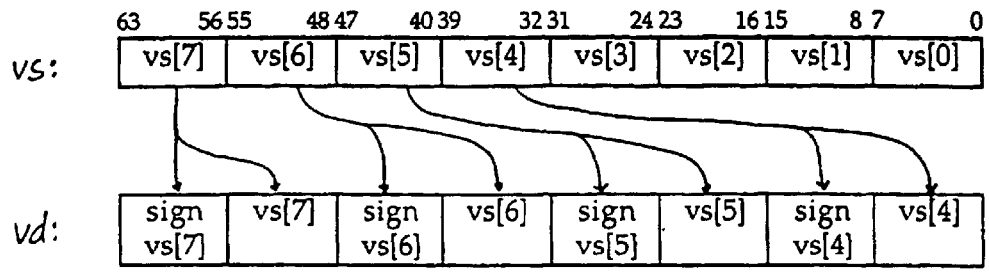
FIG. 8C illustrates a block diagram of a shuffle operation, which converts a vector of signed upper 4 bytes from a source register to four 16-bit halves in a destination register by replicating the signs across the upper bytes in the halves.

FIG. 8C illustrates a block diagram of a shuffle operation, which converts a vector of signed upper 4 bytes in a register to 16-bit halves. This shuffle operation, represented by mnemonic UPSH.OB, selects the upper 4 8-bit elements in an exemplary vector register, vs. The selected elements vs[4], vs [5], vs[6], and vs[7] are replicated into destination elements vd[0], vd[2], vd[4], and vd[6], respectively. The odd elements of the destination vector register vd[1], vd[3], vd[5], and vd[7] replicates the sign bits of the selected elements vs [4], vs[5], vs[6], and vs[7], respectively.

Figure 8D:
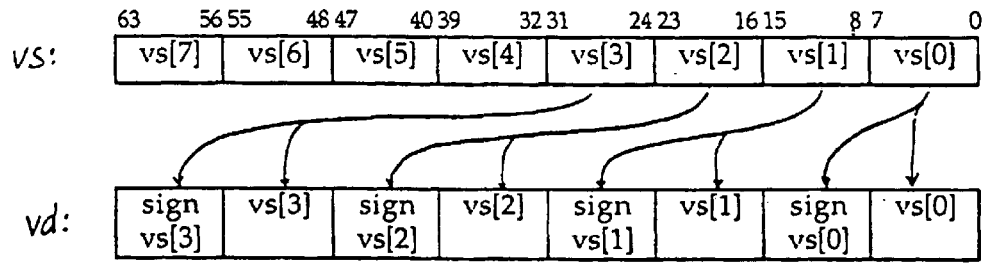
FIG. 8D illustrates a block diagram of a shuffle operation, which converts a vector of signed low 4 bytes from a source register to four 16-bit halves in a destination register by replicating the signs across the upper bytes in the halves.

FIG. 8D illustrates a block diagram of a shuffle operation, which converts a vector of signed low 4 bytes in a register to 16-bit halves. This shuffle operation, represented by mnemonic UPSL.OB, selects the lower 4 8-bit elements in an exemplary vector register, vs. The selected elements vs[0], vs[1], vs[2], and vs[3] are replicated into destination elements vd[0], vd[2], vd [4], and vd[6], respectively. The odd elements of the destination vector register vd[1], vd[3], vd[5], and vd[7] replicates the sign bits of the selected elements vs[0], vs[1], vs[2], and vs[3], respectively.

Figure 8E:
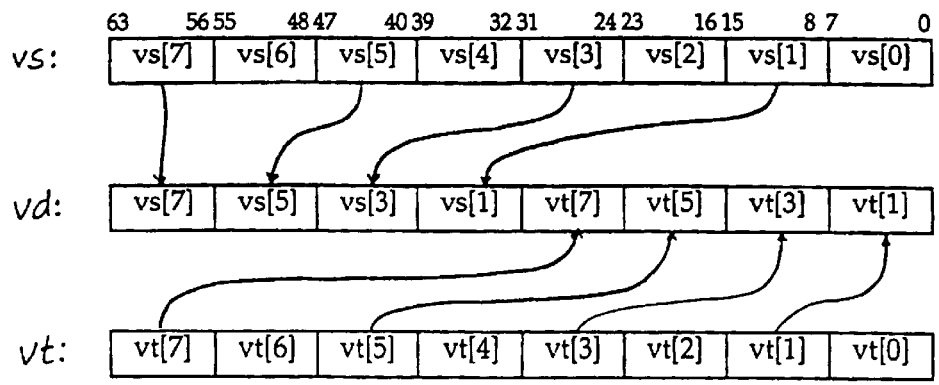
FIG. 8E illustrates a block diagram of a shuffle operation, which replicates the odd elements of 8 8-bit elements from each of two source registers into 8 elements in a destination vector register.

FIG. 8E illustrates a block diagram of a shuffle operation, which replicates the odd elements of 8 8-bit elements from each of two source registers into 8 elements in a destination vector register. This shuffle operation, represented by an exemplary mnemonic PACH.OB, selects the odd elements of 8 8-bit elements in exemplary source vector registers, vs and vt. The elements selected from vs, namely vs[1], vs[3], vs[5], and vs[7] are replicated into destination elements vd[4], vd[5], vd[6], and vd[7], respectively. The elements vt[1], vt[3], vt[5], and vt[7] from the vector register vt are replicated into destination elements vd[0], vd[1], vd[2], and vd[3], respectively.

Figure 8F:
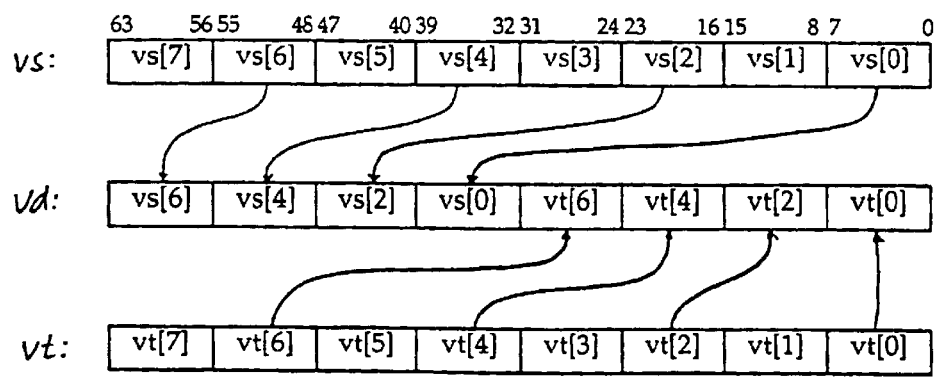
FIG. 8F illustrates a block diagram of a shuffle operation, which replicates the even elements of 8 8-bit elements from each of two source registers into 8 elements in a destination vector register.

FIG. 8F illustrates a block diagram of a shuffle operation, which replicates the even elements of 8 8-bit elements from each of two source registers into 8 elements in a destination vector register. This shuffle operation, represented by an exemplary mnemonic PACL.OB, selects the even elements of 8 8-bit elements in exemplary source vector registers, vs and vt. The elements selected from vs, namely vs[0], vs[2], vs[4], and vs[8] are replicated into destination elements vd[4], vd[5], vd[6], and vd[7], respectively. The elements vt[0], vt[2], vt[4], and vt[6] from the vector register vt are replicated into destination elements vd[0], vd[1], vd[2], and vd[3], respectively.

Figure 8G:
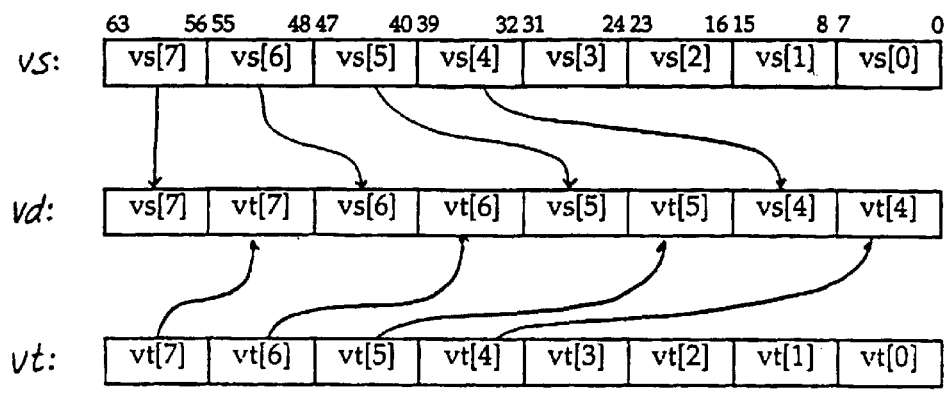
FIG. 8G illustrates a block diagram of a shuffle operation, which replicates the upper 4 elements of 8 8-bit elements from each of two source registers into 8 elements in a destination vector register.

FIG. 8G illustrates a block diagram of a shuffle operation, which replicates the upper 4 elements of 8 8-bit elements from each of two source registers into 8 elements in a destination vector register. This shuffle operation, represented by an exemplary mnemonic MIXH.OB, selects the upper 4 elements of 8 8-bit elements in exemplary source vector registers, vs and vt. The elements selected from vs, namely vs[4], vs[5], vs[6], and vs[7] are replicated into the odd elements of the destination vector register, namely vd[1], vd[3], vd[5], and vd[7], respectively. The elements vt[4], vt[5], vt[6],and vt[7] from the vector register vt are replicated into the even elements of the destination elements vd[0], vd[2], vd[4], and vd[6], respectively.

Figure 8H:
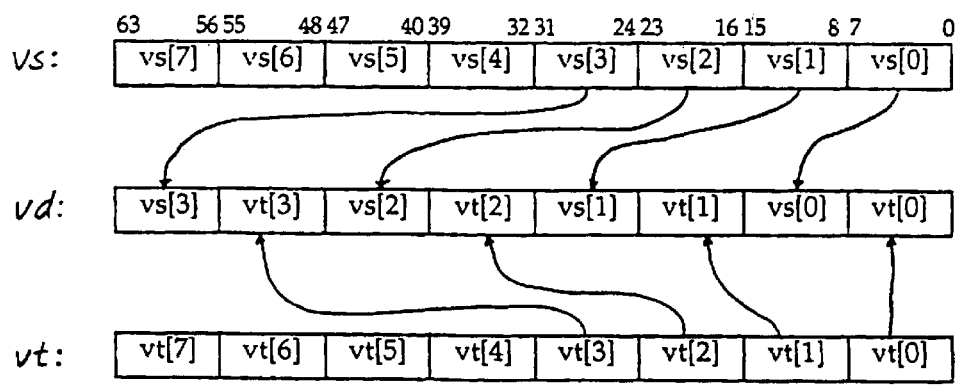
FIG. 8H illustrates a block diagram of a shuffle operation, which replicates the lower 4 elements of 8 8-bit elements from each of two source registers into 8 elements in a destination vector register.

FIG. 8H illustrates a block diagram of a shuffle operation, which replicates the lower 4 elements of 8 8-bit elements from each of two source registers into 8 elements in a destination vector register. This shuffle operation, represented by an exemplary mnemonic MIXL.OB, selects the lower 4 elements of 8 8-bit elements in exemplary source vector registers, vs and vt. The elements selected from vs, namely vs[0], vs[1], vs[2], and vs[3] are replicated into the odd elements of the destination vector register, namely vd[1], vd[3], vd[5], and vd[7], respectively. The elements vt[0], vt[1], vt[2], and vt[3] from the vector register vt are replicated into the even elements of the destination elements vd[0], vd[2], vd[4], and vd[6], respectively.

A shuffle instruction operating in QH mode generates a new vector of elements for two types of operations. The first type of operation creates a vector of new data sizes by converting data sizes between 16-bit elements and 32-bit elements in a vector. The second type creates a new vector of elements drawn from two other vectors. The present exemplary data type conversion operations enable a larger range of computational data format than their storage format, such as 32 bit computation on 16 bit numbers. In addition, the present embodiment operations allow conversion of a data set from a smaller range format to a larger range format or vice versa as between 16 and 32 bit data.

FIG. 9 illustrates shuffle operations for ordering 16-bit elements in a 64-bit doubleword. Each row represents the destination vector register, vd, comprised of 4 elements, vd[0] to vd[7]. The first row 902 is comprised of placeholders to indicate the 4 elements. Below the first row 902 are 4 different shuffle operations in QH mode as indicated by the content of destination vector register, vd, for each row 904 to 918. These shuffle operations in QH mode are illustrated in FIGS. 10A through 10H.

Figure 10A:
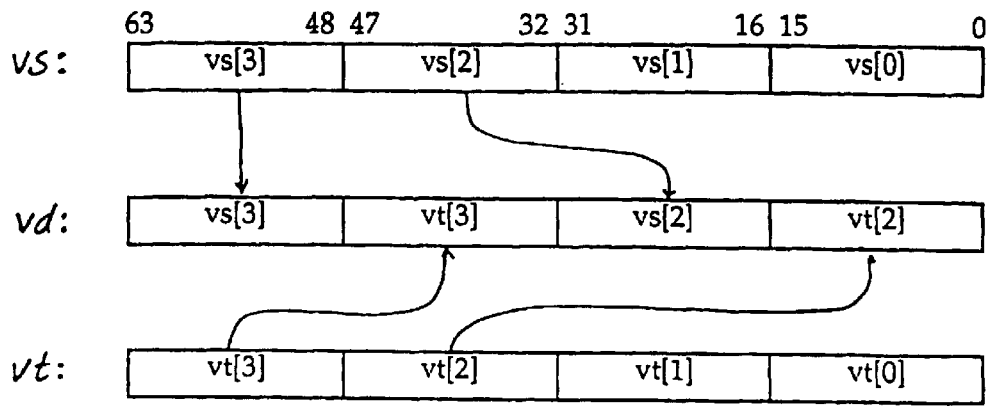
FIG. 10A illustrates a block diagram of a shuffle operation, which replicates the upper 2 elements of 4 16-bit elements from each of two source registers into 4 elements in a destination vector register.

FIG. 10A illustrates a block diagram of a shuffle operation, which replicates the upper 2 elements of 4 16-bit elements from each of two source registers into 4 elements in a destination vector register. This shuffle operation, represented by an exemplary mnemonic MIXH.QH, selects the upper 2 elements of 4 16-bit elements in exemplary source vector registers, vs and vt. The elements selected from vs, namely vs[2] and vs[3] are replicated into the odd elements of the destination vector register, namely vd[1] and vd[3], respectively. The elements vt[2] and vt[3] from the vector register vt are replicated into the even elements of the destination elements vd[0] and vd[2], respectively.

Figure 10B:
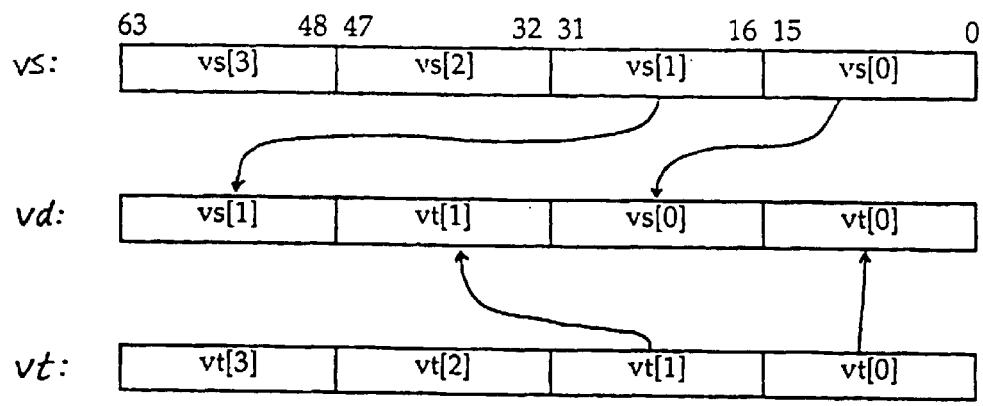
FIG. 10B illustrates a block diagram of a shuffle operation, which replicates the lower 2 elements of 4 16-bit elements from each of two source registers into 4 elements in a destination vector register.

FIG. 10B illustrates a block diagram of a shuffle operation, which replicates the lower 2 elements of 4 16-bit elements from each of two source registers into 4 elements in a destination vector register. This shuffle operation, represented by an exemplary mnemonic MIXL.QH, selects the lower 2 elements of 4 16-bit elements in exemplary source vector registers, vs and vt. The elements selected from vs, namely vs[0] and vs[1] are replicated into the odd elements of the destination vector register, namely vd[1] and vd[3], respectively. The elements vt[0] and vt[1] from the vector register vt are replicated into the even elements of the destination elements vd[0] and vd[2], respectively.

Figure 10C:
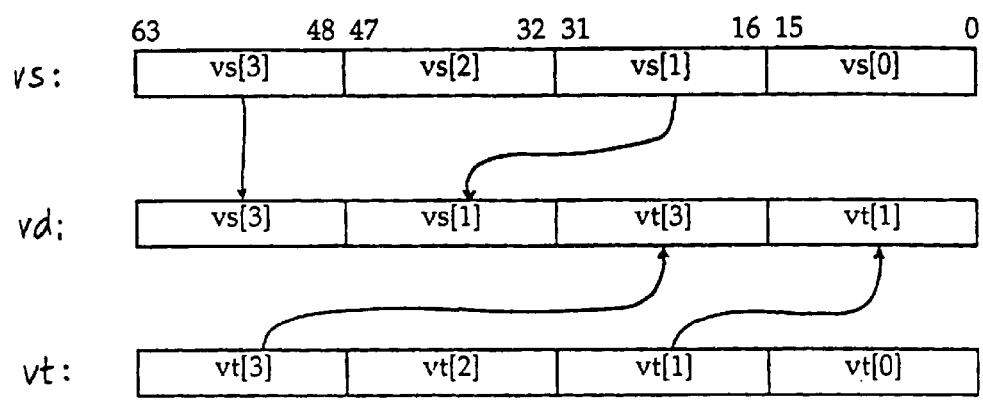
FIG. 10C illustrates a block diagram of a shuffle operation, which replicates 2 odd elements of 4 16-bit elements from each of two source registers into 4 elements in a destination vector register.

FIG. 10C illustrates a block diagram of a shuffle operation, which replicates 2 odd elements of 4 16-bit elements from each of two source registers into 4 elements in a destination vector register. This shuffle operation, represented by an exemplary mnemonic PACH.QH, selects the 2 odd elements of 4 16-bit elements in exemplary source vector registers, vs and vt. The elements selected from vs, namely vs[1] and vs[3] are replicated into the upper 2 elements of the destination vector register, namely vd[2] and vd[3], respectively. The elements vt[1] and vt[3] from the vector register vt are replicated into the lower 2 elements of the destination elements vd[0] and vd[1], respectively.

Figure 10D:
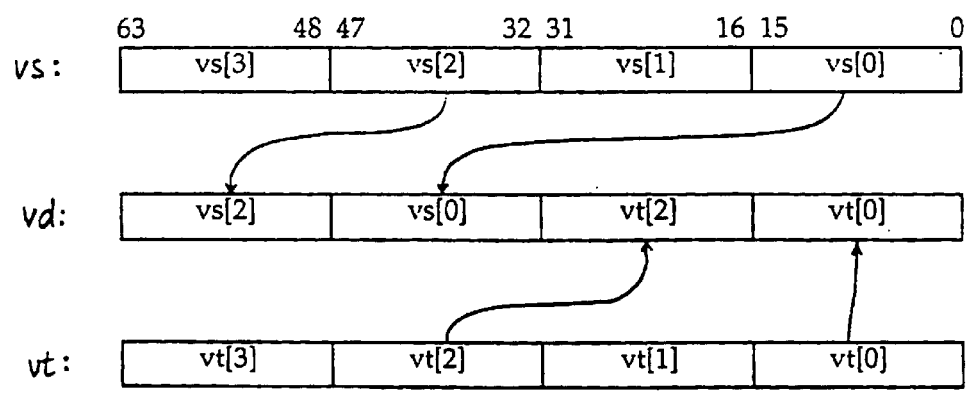
FIG. 10D illustrates a block diagram of a shuffle operation, which replicates 2 even elements of 4 16-bit elements from each of two source registers into 4 elements in a destination vector register.

FIG. 10D illustrates a block diagram of a shuffle operation, which replicates 2 even elements of 4 16-bit elements from each of two source registers into 4 elements in a destination vector register. This shuffle operation, represented by an exemplary mnemonic PACL.QH, selects the 2 even elements of 4 16-bit elements in exemplary source vector registers, vs and vt. The elements selected from vs, namely vs[0] and vs[2] are replicated into the upper 2 elements of the destination vector register, namely vd[2] and vd[3], respectively. The elements vt[0] and vt[2] from the vector register vt are replicated into the lower 2 elements of the destination elements vd[0] and vd[1], respectively.

Figure 10E:
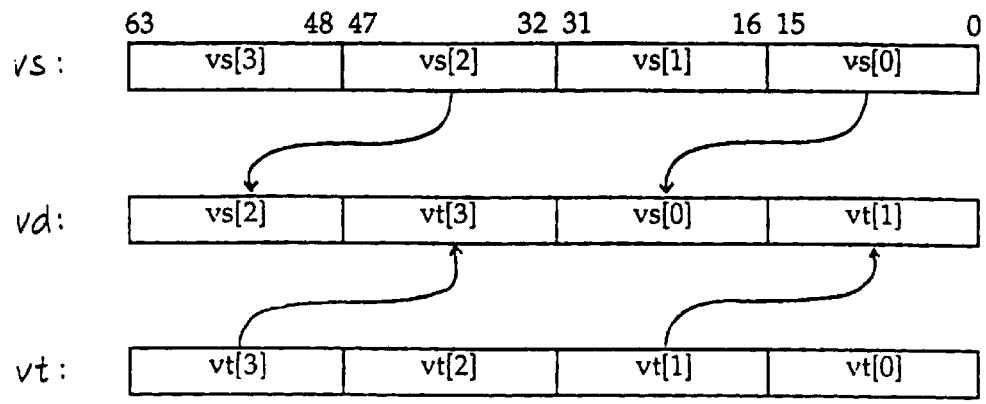
FIG. 10E illustrates a block diagram of a shuffle operation, which replicates even elements 0 and 2 from one source register into odd elements 1 and 3 in a destination vector register and further replicates odd elements 1 and 3 from another source register into the even elements 1 respectively, of the destination vector register.

FIG. 10E illustrates a block diagram of a shuffle operation, which replicates even elements from one source register and odd elements from another source register into a destination vector register. This shuffle operation, represented by an exemplary mnemonic BFLA.QH, selects the 2 even elements of 4 16-bit elements from an exemplary source vector register, vs. The shuffle operation also selects the 2 odd elements of 4 16-bit elements from another exemplary source vector register, vt. The even elements selected from vs, namely vs[0] and vs[2] are replicated into the 2 odd elements of the destination vector register, namely vd[1] and vd[3], respectively. The odd elements vt[1] and vt[3] from the vector register vt are replicated into the 2 even elements of the destination elements vd[0] and vd[1], respectively.

Figure 10F:
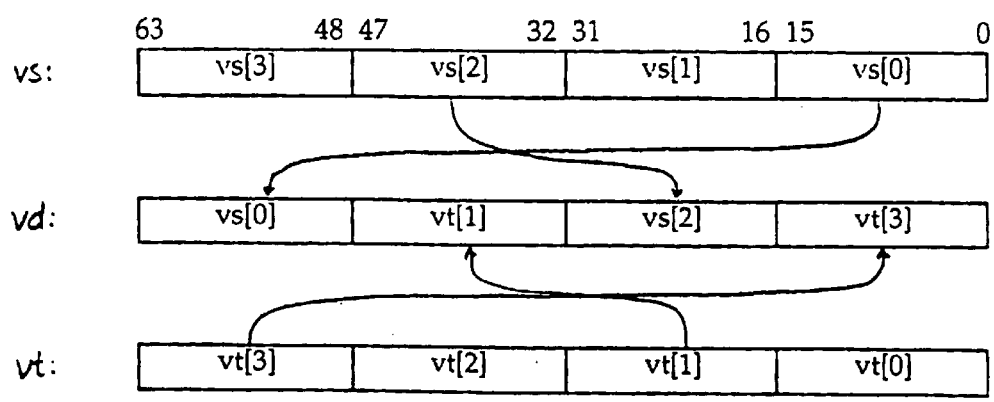
FIG. 10F illustrates a block diagram of a shuffle operation, which replicates even elements 0 and 2 from one source register into odd elements 3 and 1, respectively, in a destination vector register and further replicates odd elements 1 and 3 from another source register into the even elements 2 and 0, respectively, of the destination vector register.

FIG. 10F illustrates a block diagram of a shuffle operation, which replicates even elements from one source register and odd elements from another source register into a destination vector register. This shuffle operation, represented by an exemplary mnemonic BFLB.QH, selects the 2 even elements of 4 16-bit elements from an exemplary source vector register, vs. The shuffle operation also selects the 2 odd elements of 4 16-bit elements from another exemplary source vector register, vt. The even elements selected from vs, namely vs[0] and vs[2] are replicated into the 2 odd elements of the destination vector register in reverse order, namely vd[3] and vd[1], respectively. The odd elements vt[1] and vt[3] from the vector register vt are replicated into the 2 even elements of the destination elements in reverse order, namely vd[0] and vd[1], respectively.

Figure 10G:
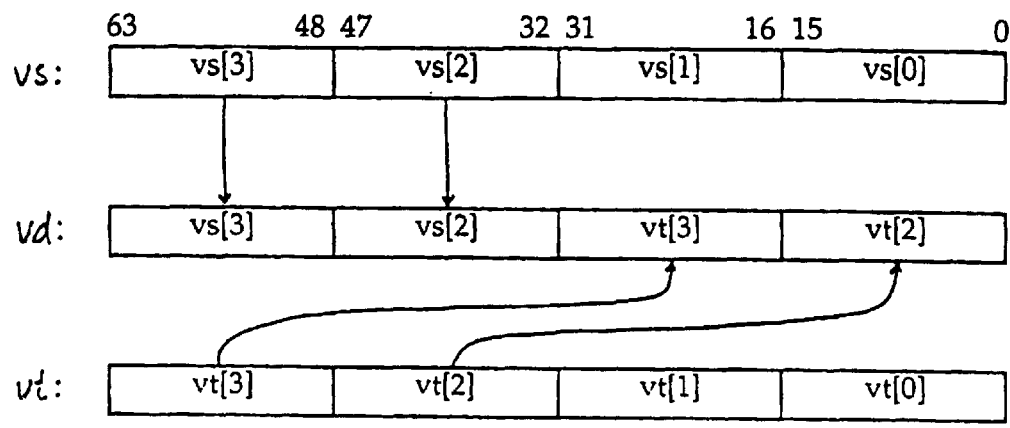
FIG. 10G illustrates a block diagram of a shuffle operation, which replicates the upper 2 elements of 4 16-bit elements from each of two source registers into a destination vector register.

FIG. 10G illustrates a block diagram of a shuffle operation, which replicates the upper 2 elements of 4 16-bit elements from each of two source registers into a destination vector register. This shuffle operation, represented by an exemplary mnemonic REPA.QH, selects the upper 2 elements of 4 16-bit elements in exemplary source vector registers, vs and vt. The upper elements selected from vs, namely vs[2] and vs[3] are replicated into the upper elements of the destination vector register, namely vd[2] and vd[3], respectively. The upper elements vt[2] and vt[3] from the vector register vt are replicated into the lower elements of the destination elements vd[0] and vd[2], respectively.

Figure 10H:
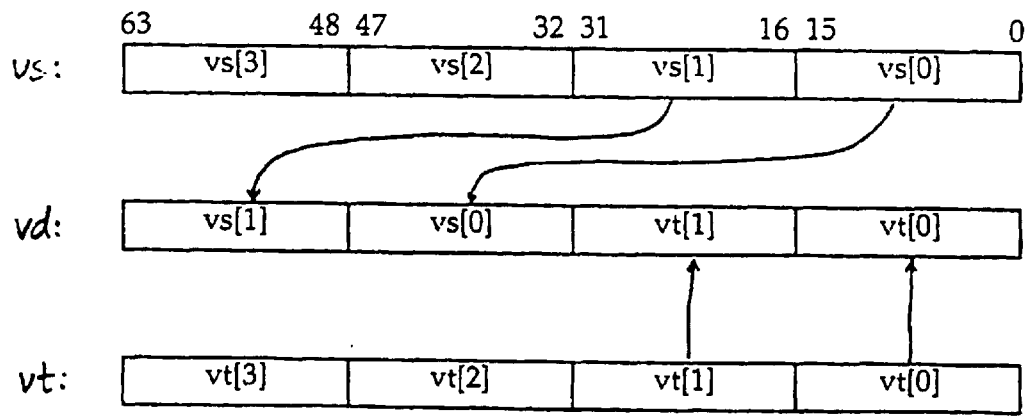
FIG. 10H illustrates a block diagram of a shuffle operation, which replicates the lower 2 elements of 4 16-bit elements from each of two source registers into a destination vector register.
Figure 1:
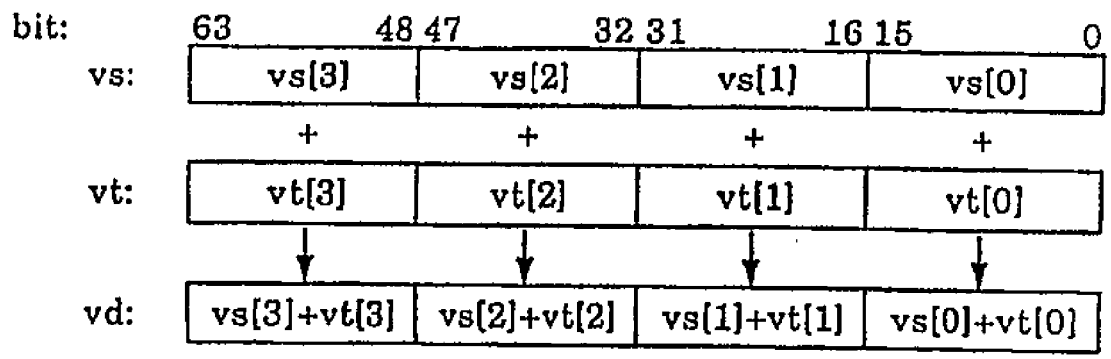
Figure 2:
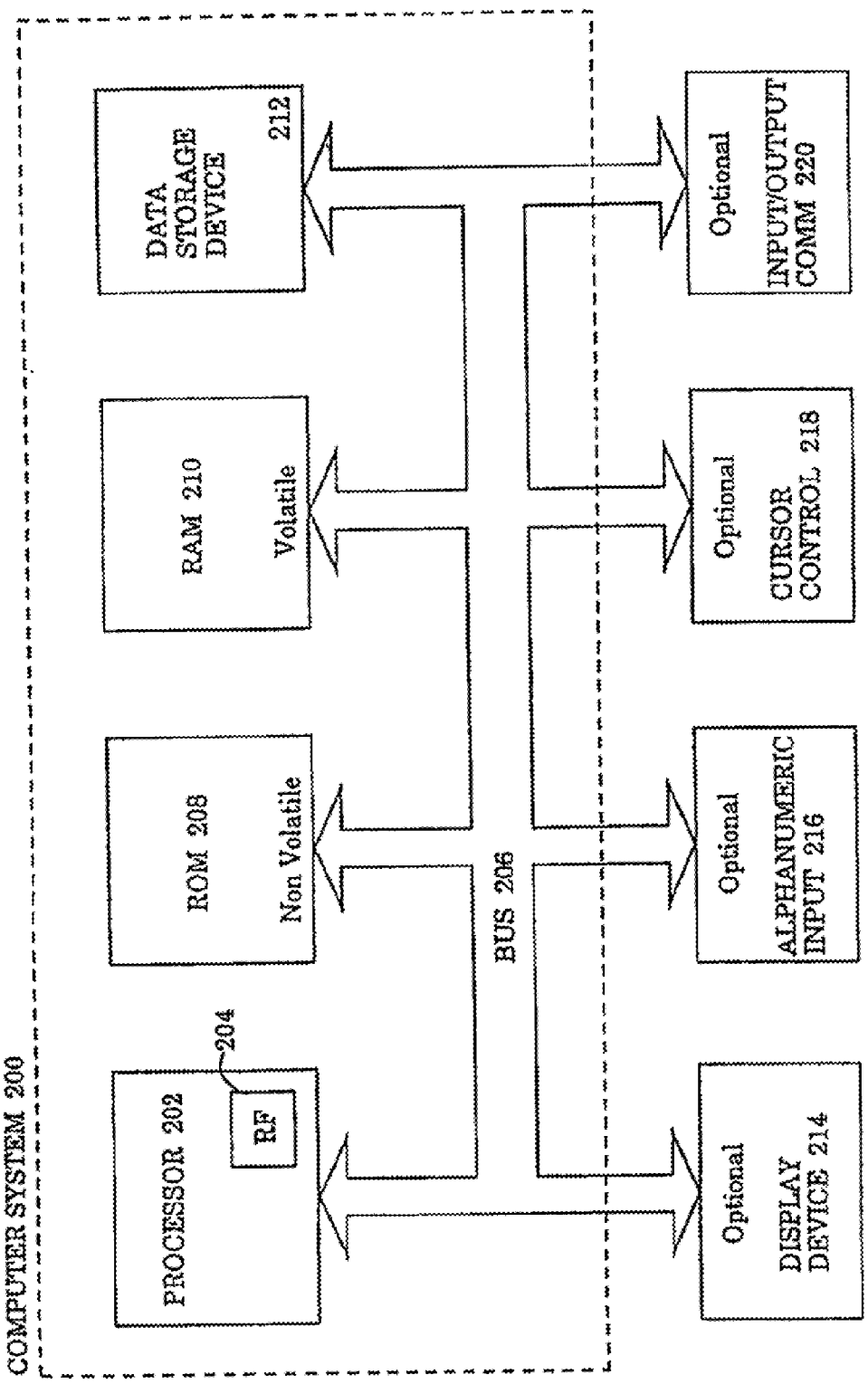
Figure 3:
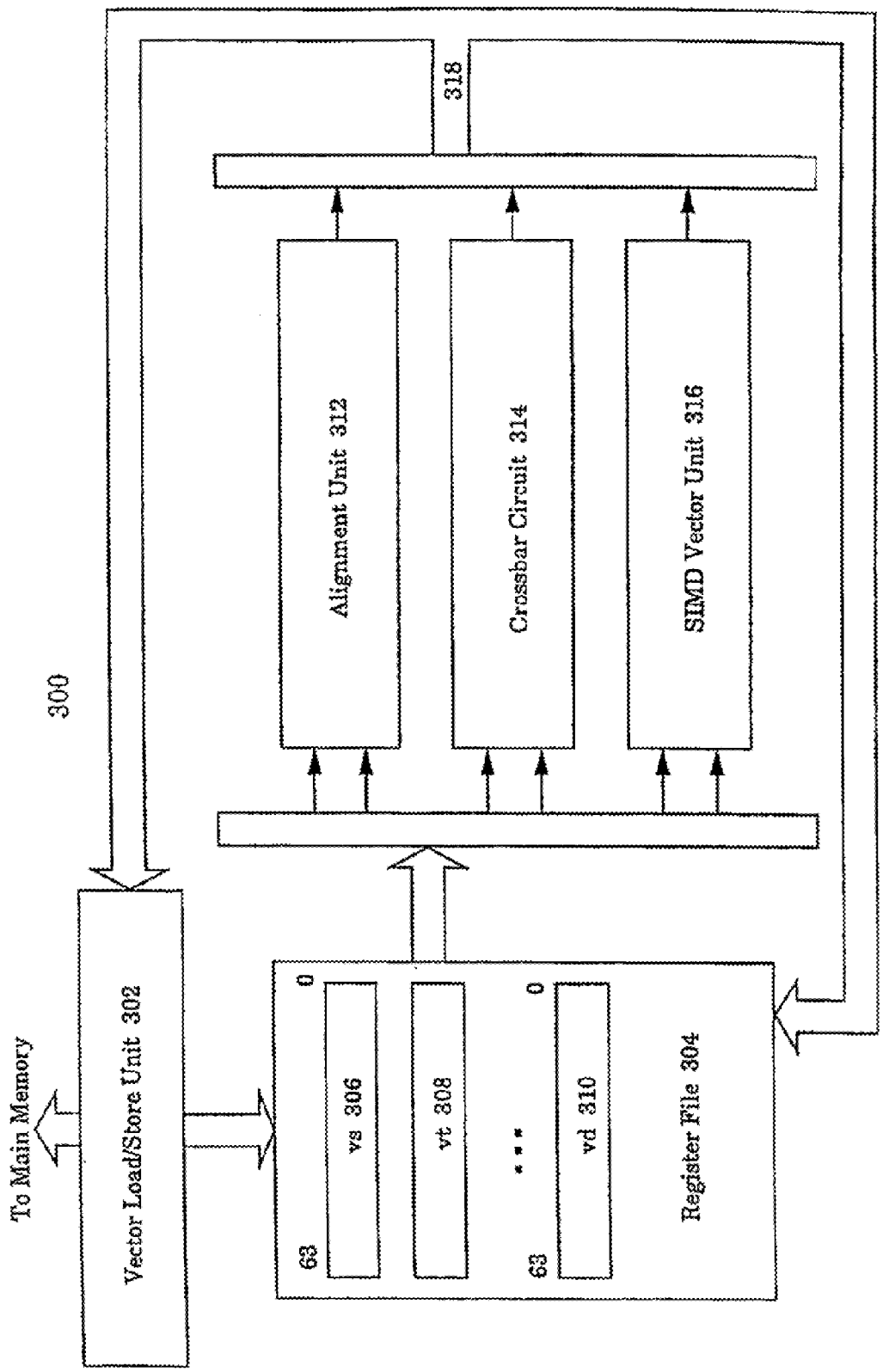
Figure 4:
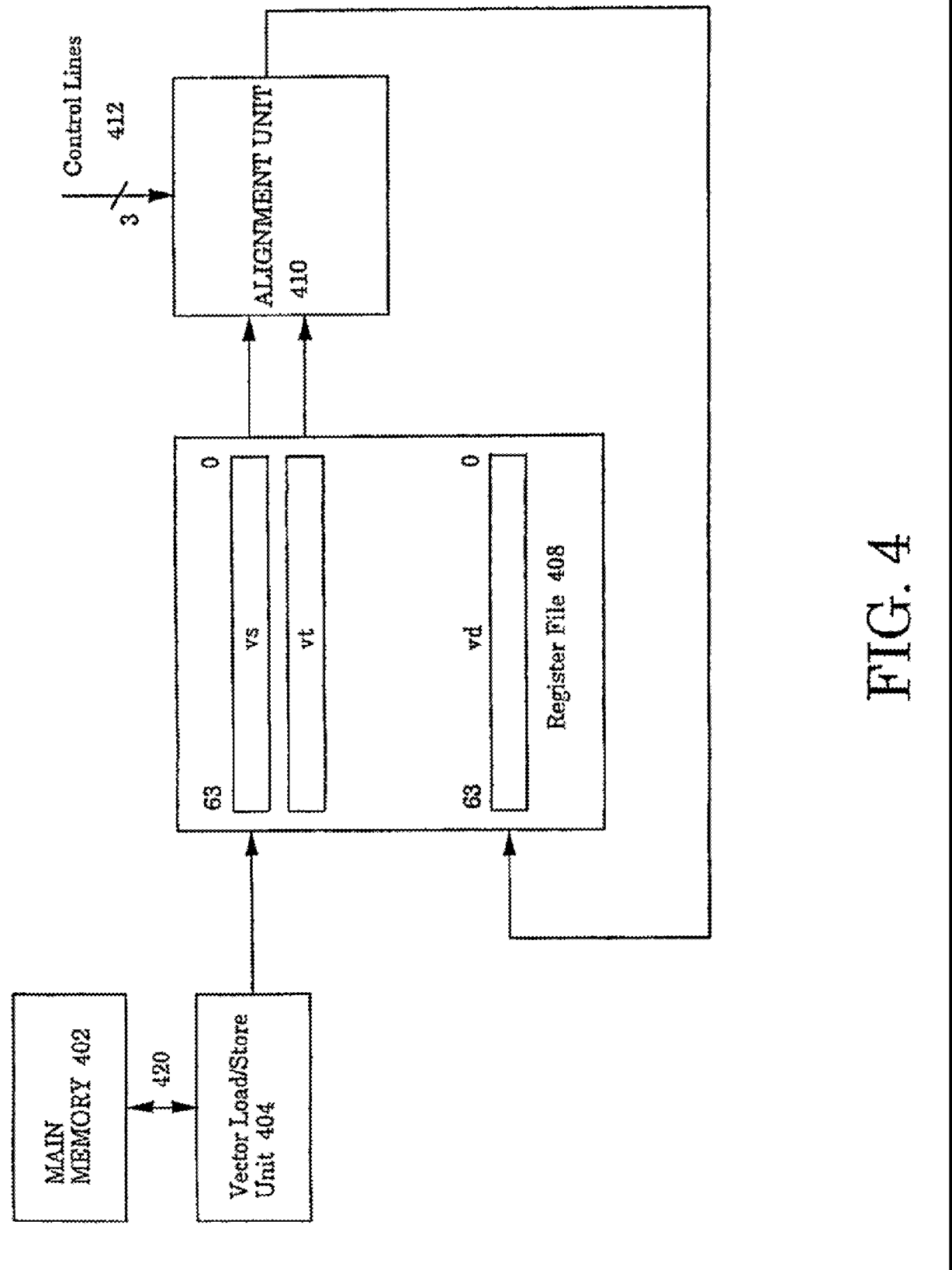
Figure 5:
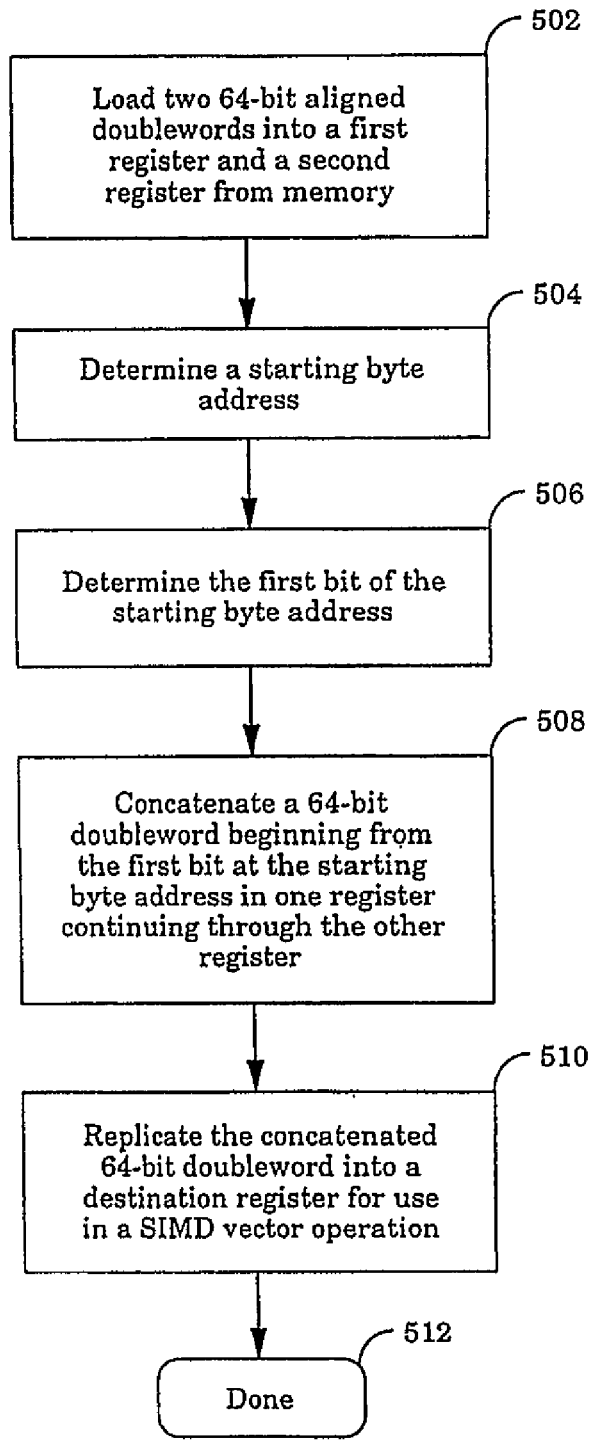
Figure 6A:
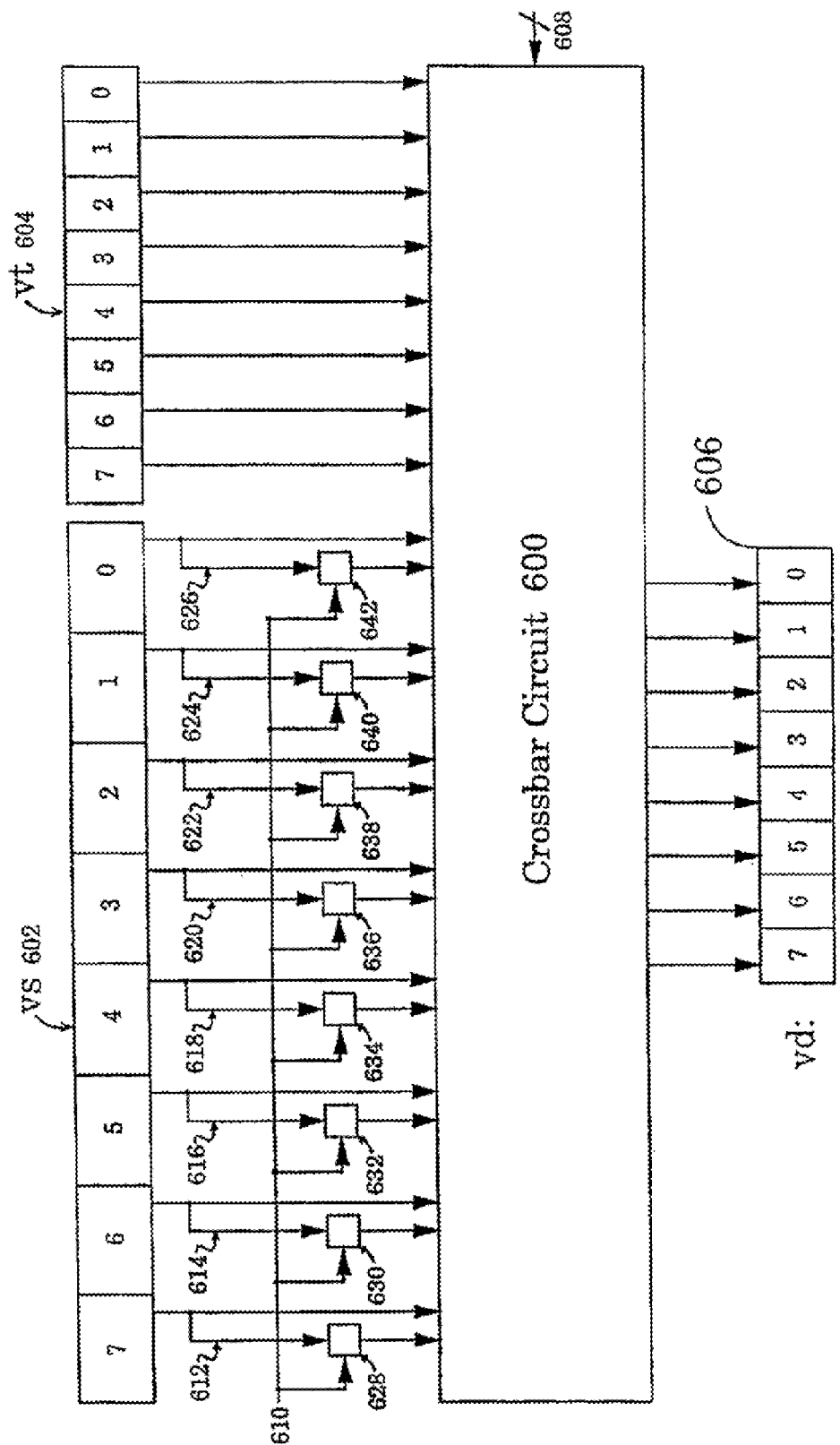
Figure 6B:
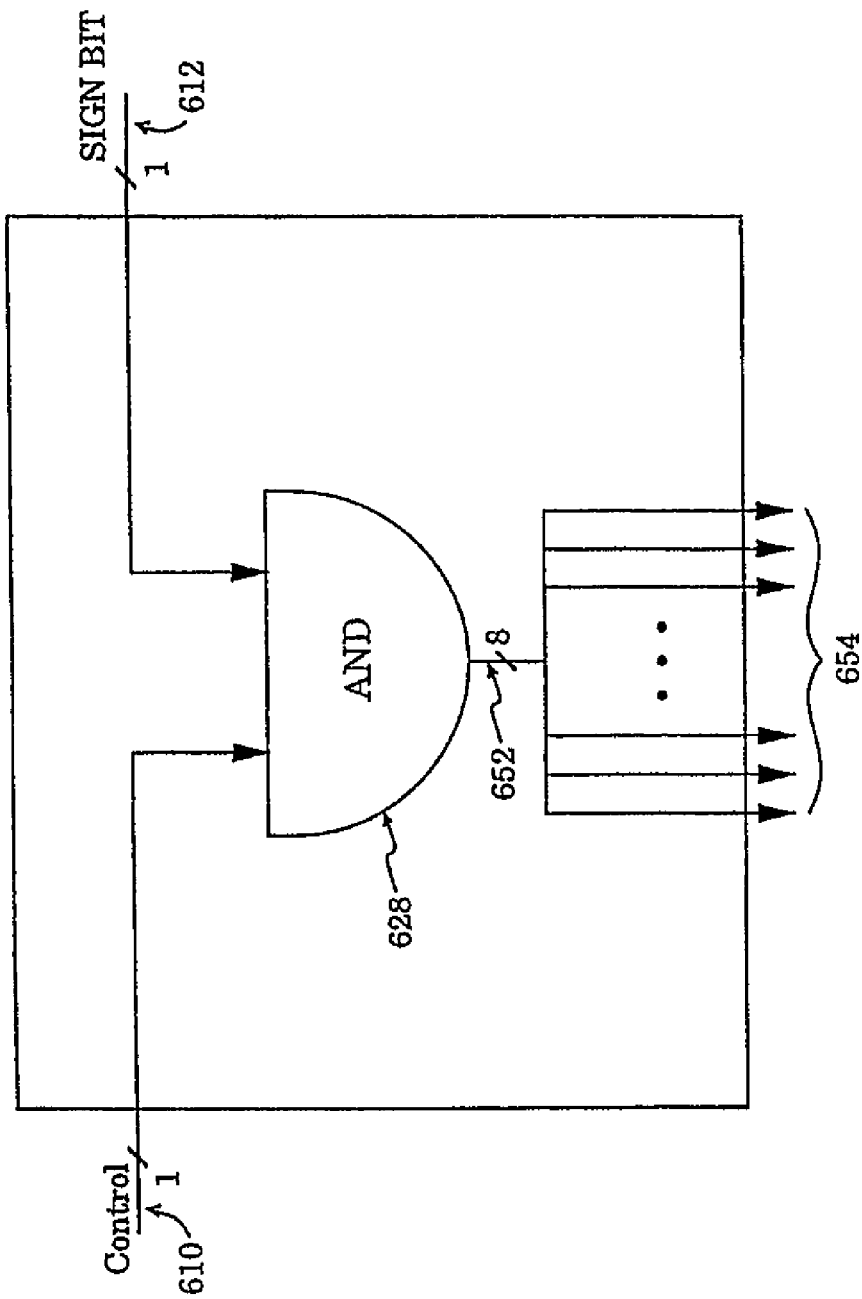
Figure 8A:
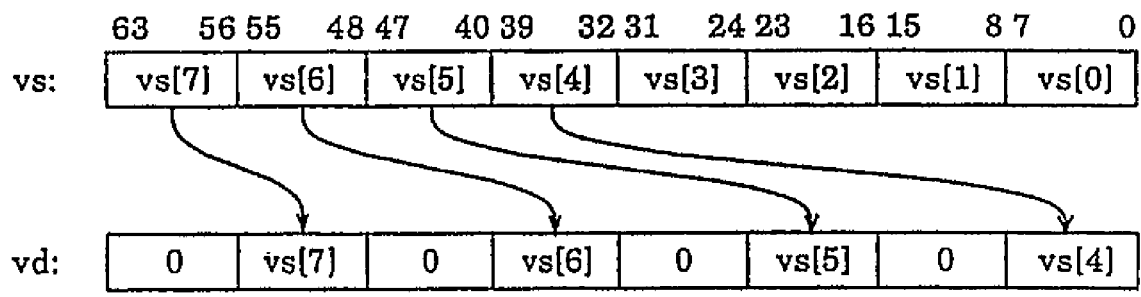
Figure 8B:
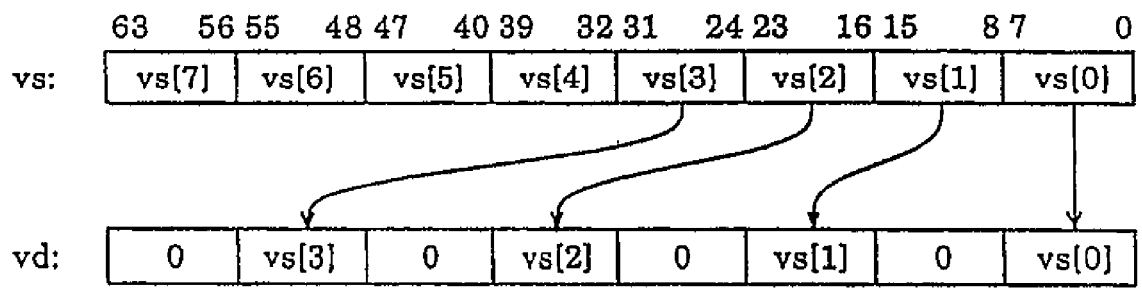
Figure 8C:
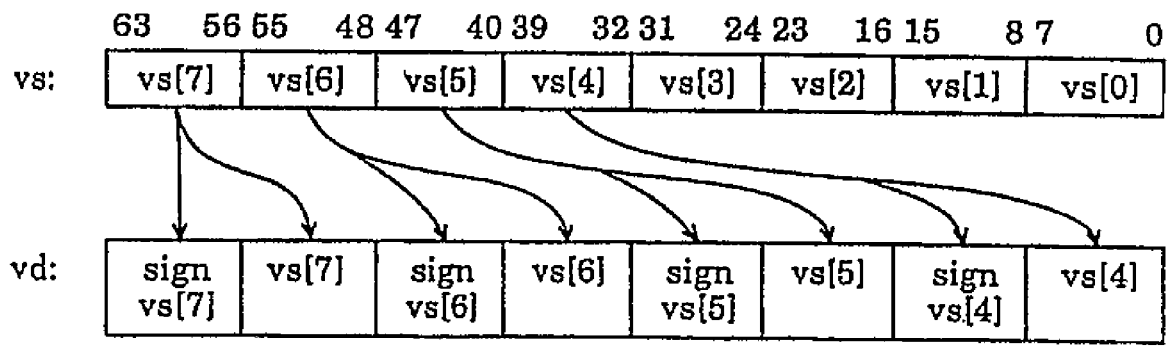
Figure 8D:
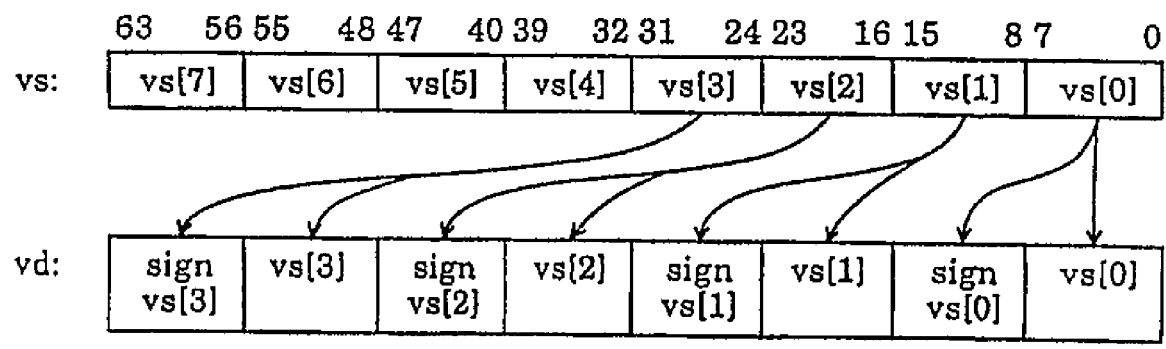
Figure 8E:
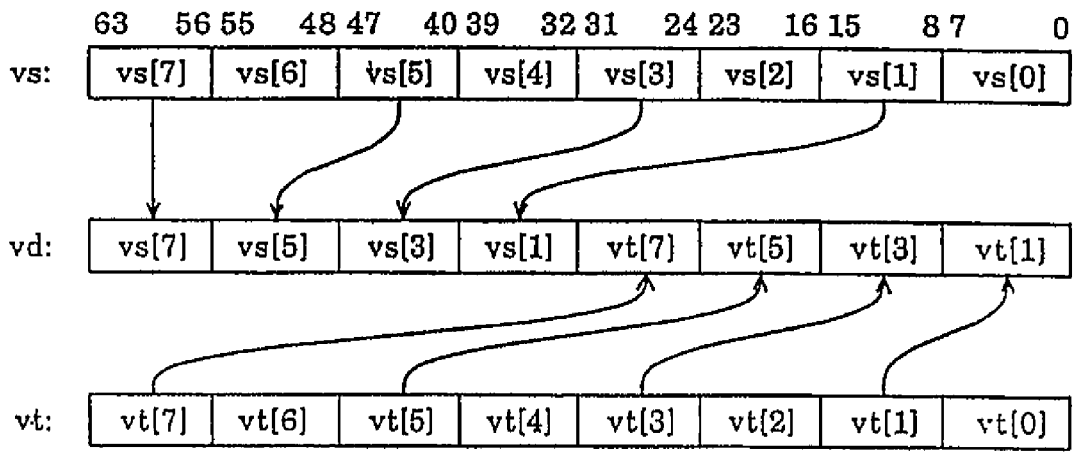
Figure 8F:
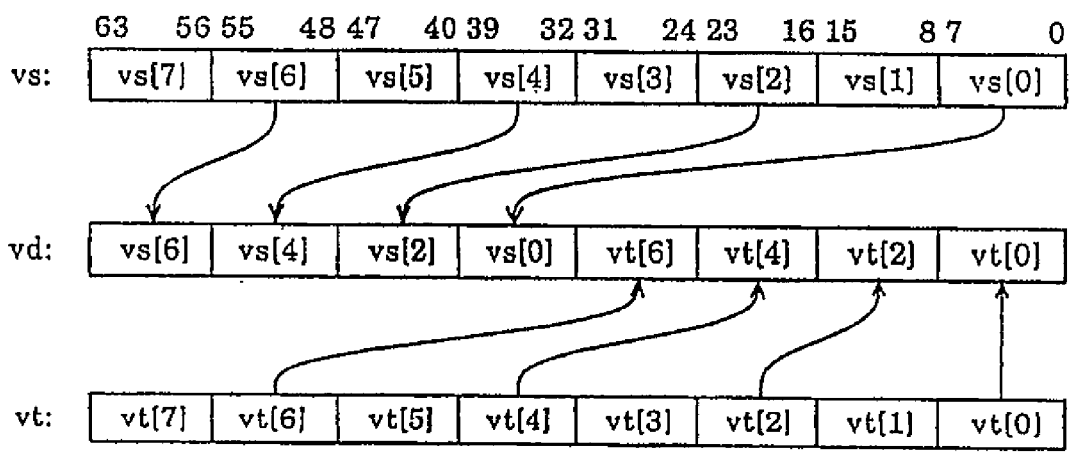
Figure 8G:
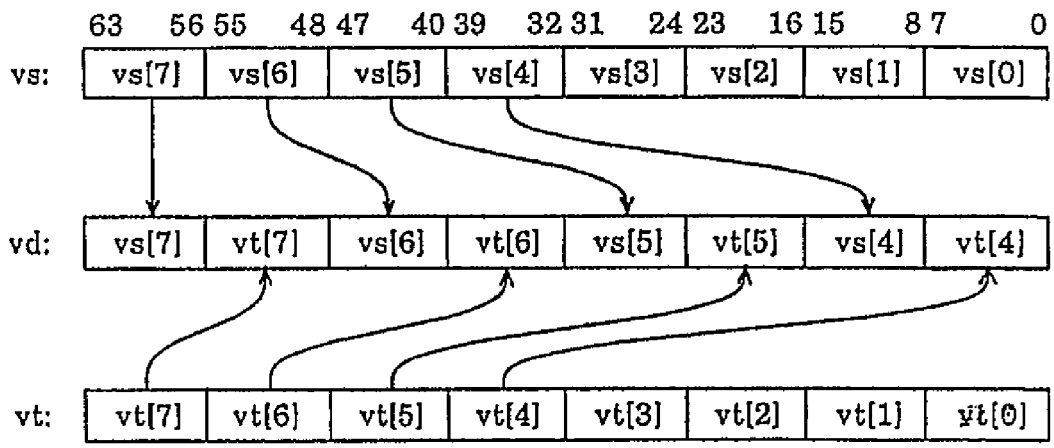
Figure 8H:
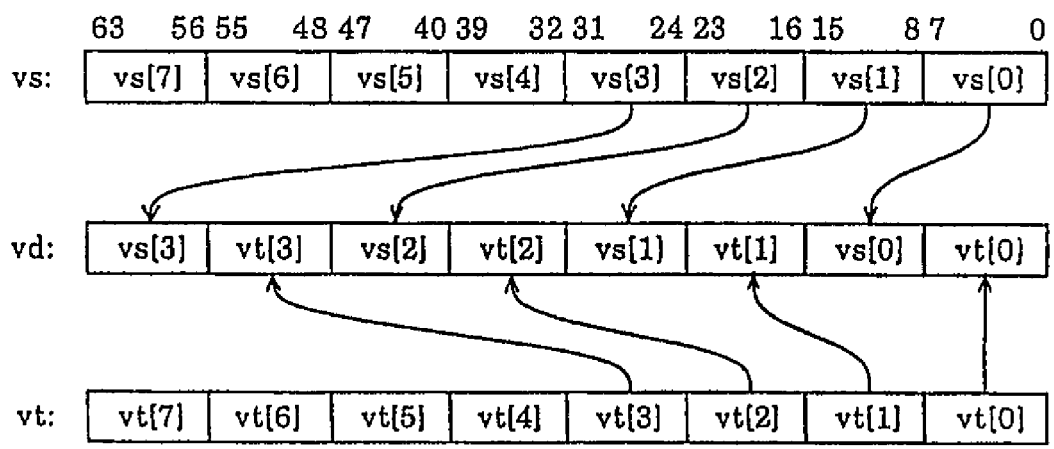
Figure 10A:
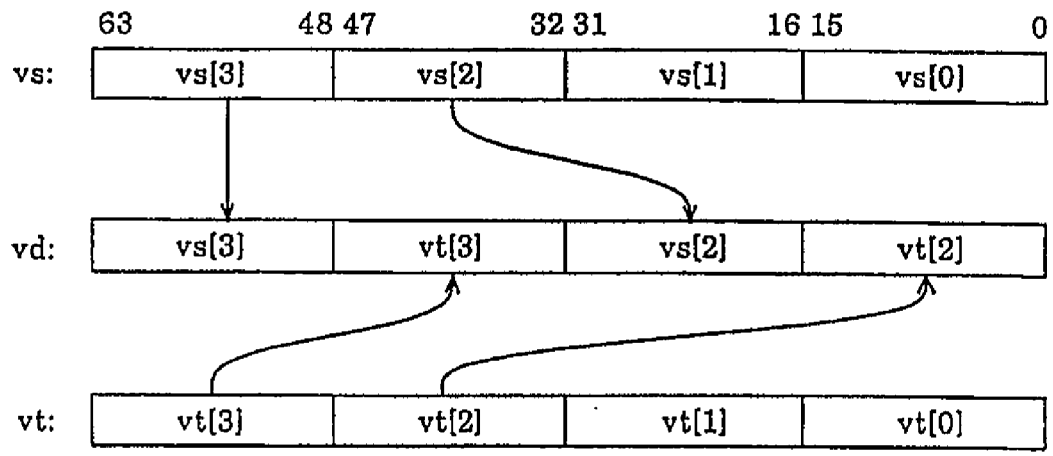
Figure 10B:
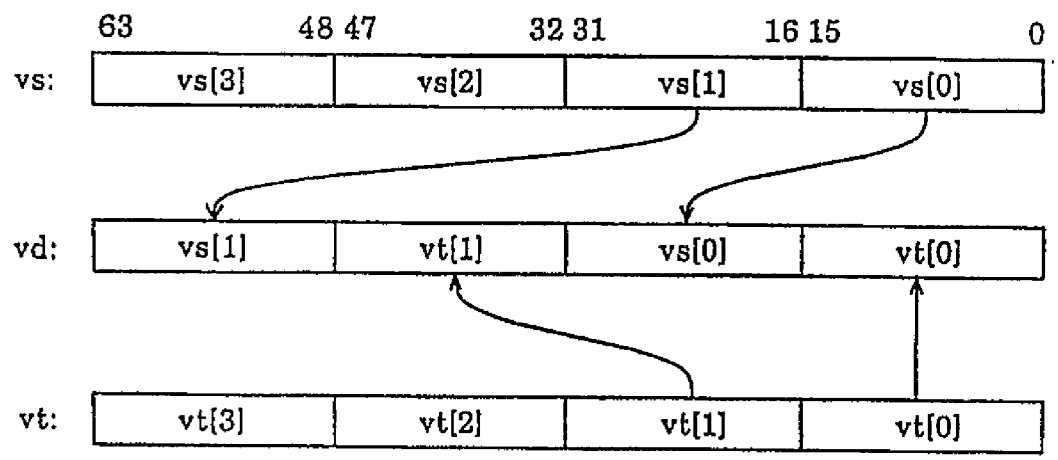
Figure 10C:
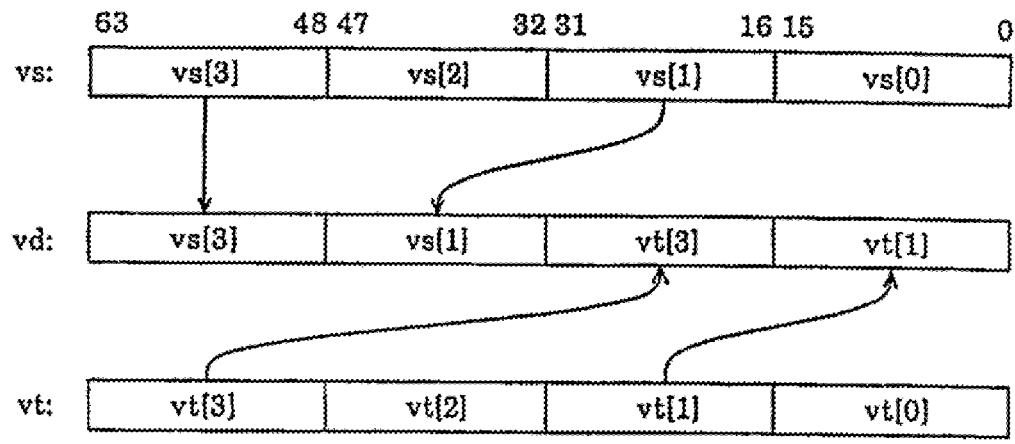
Figure 10D:
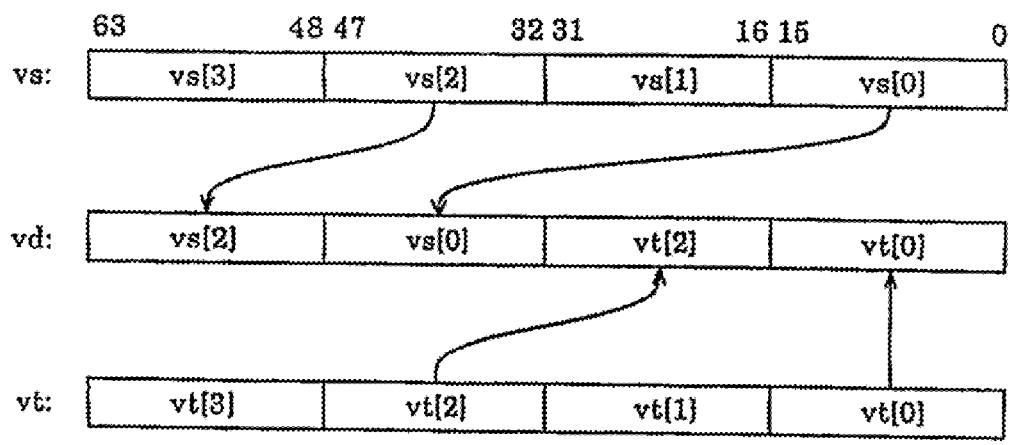
Figure 10E:
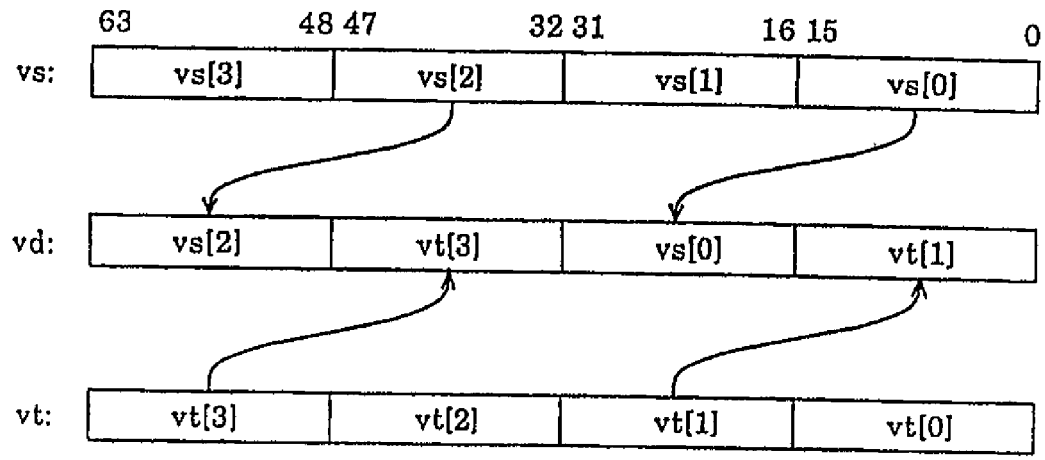
Figure 10F:
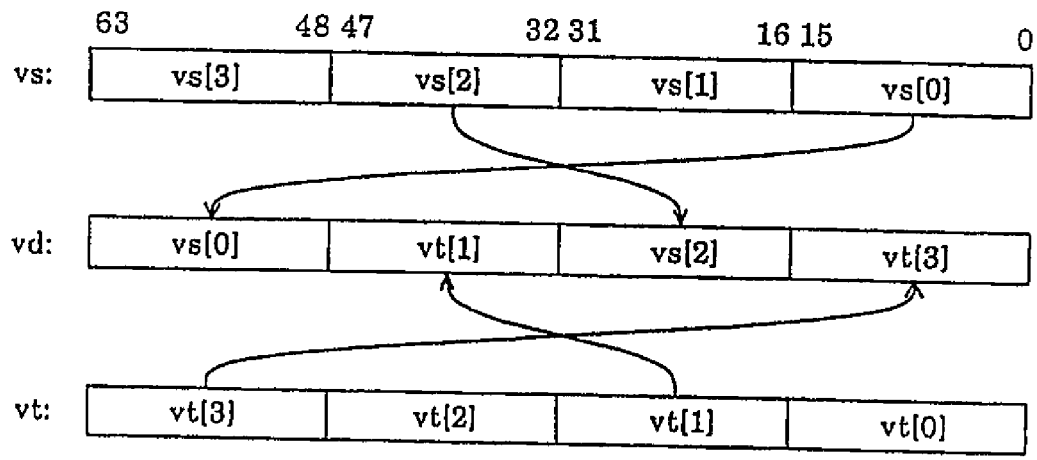
Figure 10G:
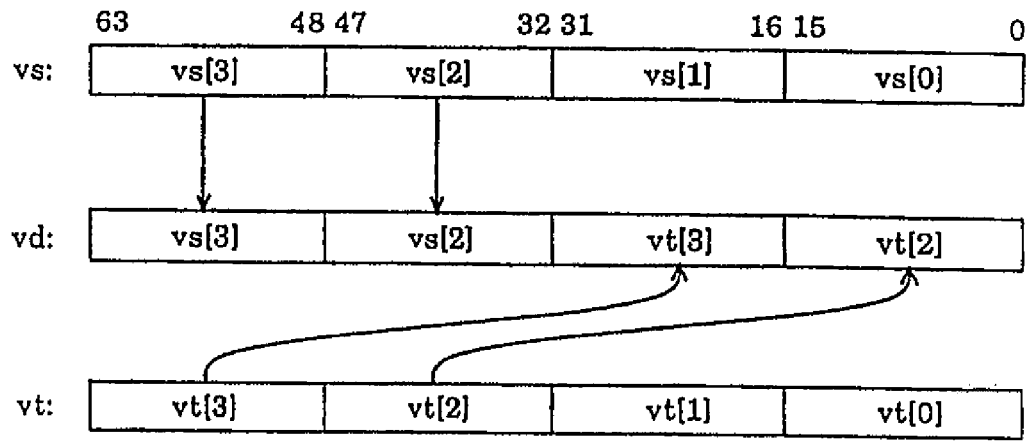
Figure 10H:
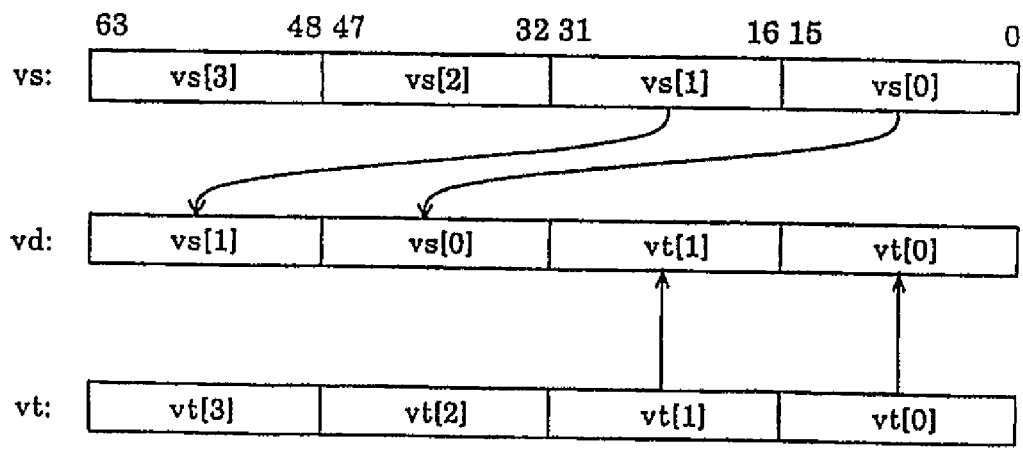

FIG. 10H illustrates a block diagram of a shuffle operation, which replicates the lower 2 elements of 4 16-bit elements from each of two source registers into a destination vector register. This shuffle operation, represented by an exemplary mnemonic REPB.QH, selects the lower 2 elements of 4 16-bit elements in exemplary source vector registers, vs and vt. The lower elements selected from vs, namely vs[0] and vs[1] are replicated into the upper elements of the destination vector register, namely vd[2] and vd[3], respectively. The lower elements vt[0] and vt[1] from the vector register vt are replicated into the lower elements of the destination elements vd[0] and vd[2], respectively.

The shuffle instructions allow more efficient SIMD vector operations. First, the shuffle operation creates a vector of new data sizes by converting between 8-bit elements and 16-bit elements in a vector. These data type conversions enable a larger range of computational data format than their storage format, such as 16 bit computation on 8 bit numbers. For example, these operations allow conversion of a data set from a smaller range format to a larger range format or vice versa as between 8 and 16 bit audio or video data.

Second, the shuffle operations are also useful in interleaving and deinterleaving data. For example, some applications store multiple channel data in separate arrays, or interleaved in a single array. These applications typically require interleaving or deinterleaving the multiple channels. In these applications, separate R, G, B, A byte arrays may be con verted into an interleaved RGBA array by the following series of shuffle instructions:

MIXL.OB RGL, R, G; RGRGRGRG
MIXL.OB BAL, B, A; BABABABA
MIXH.OB RGH, R, G; RGRGRGRG
MIXH.OB BAH, B, A; BABABABA
MIXL.QS RGBALL, RGL, BAL; RGBARGBA
MIXH.QS RGBALH, RGL, BAL; RGBARGBA
MIXL.QS RGBAHL, RGH, BAH; RGBARGBA
MIXH.QS RGBAHH, RGH, BAH; RGBARGBA

Conversely, an interleaved RGBA array may be deinterleaved into separate R, G, B, and A arrays by the following series of shuffle instructions:

| | |
|---|---|
| PACL.OB | GA0GA1, RGBA0, RGBA1 |
| PACH.OB | RB0RB1, RGBA0, RGBA1 |
| PACL.OB | GA2GA3, RGBA2, RGBA3 |
| PACH.OB | RB2RB3, RGBA2, RGBA3 |
| PACL.OB | A0A1A2A3, GA0GA1, GA2GA3 |
| PACH.OB | G0G1G2G3, GA0GA1, GA2GA3 |
| PACL.OB | B0B1B2B3, RB0RB1, RB2RB3 |
| PACH.OB | R0R1R2R3, RB0RB1, RB2RB3 |

Third, some algorithms operate on 2 dimensional arrays of data such as images. Such an array typically orders the elements of the array in a major axis, where the elements are consecutive, and a minor axis, where the elements are separated by the size of the major axis. Often, a transpose operation is performed on the 2 dimensional array by converting the major axis to minor axis and vice versa. A common example is a discrete cosine transformation (DCT) requiring transposing 8×8 block of array. In this example, the 8×8 block of array consists of following elements:

| | d0 | d1 | d2 | d3 | d4 | d5 | d6 | d7 |
|---|---|---|---|---|---|---|---|---|
| s0 | A0 | B0 | C0 | D0 | E0 | F0 | G0 | H0 |
| s1 | A1 | B1 | C1 | D1 | E1 | F1 | G1 | H1 |
| s2 | A2 | B2 | C2 | D2 | E2 | F2 | G2 | H2 |
| s3 | A3 | B3 | C3 | D3 | E3 | F3 | G3 | H3 |
| s4 | A4 | B4 | C4 | D4 | E4 | F4 | G4 | H4 |
| s5 | A5 | B5 | C5 | D5 | E5 | F5 | G5 | H5 |
| s6 | A6 | B6 | C6 | D6 | E6 | F6 | G6 | H6 |
| s7 | A7 | B7 | C7 | D7 | E7 | F7 | G7 | H7 |

The present invention can transpose the 8×8 transpose in OB mode in 24 instructions, of which 12 are shown as follows:

| | |
|---|---|
| MIXH.OB t0, s0, s1 | A0 A1 B0 B1 C0 C1 D0 D1 |
| MIXH.OB t1, s2, s3 | A2 A3 B2 B3 C2 C3 D2 D3 |
| MIXH.OB t2, s4, s5 | A4 A5 B4 B5 C4 C5 D4 D5 |
| MIXH.OB t3, s6, s7 | A6 A7 B6 B7 C6 C7 D6 D7 |
| MIXH.QH u0, t0, t1 | A0 A1 A2 A3 B0 B1 B2 B3 |
| MIXH.QH u1, t2, t3 | A4 A5 A6 A7 B4 B5 B6 B7 |
| MIXH.QH u2, t0, t1 | C0 C1 C2 C3 D0 D1 D2 D3 |
| MIXH.QH u3, t2, t3 | C4 C5 C6 C7 D4 D5 D6 D7 |
| REPA.QH d0, u0, u1 | A0 A1 A2 A3 A4 A5 A6 A7 |
| REPB.QH d1, u0, u1 | B0 B1 B2 B3 B4 B5 B6 B7 |
| REPA.QH d2, u2, u3 | C0 C1 C2 C3 C4 C5 C6 C7 |
| REPB.QH d3, u2, u3 | D0 D1 D2 D3 D4 D5 D6 D7 |
| MIXL.OB t0, s0, s1 | E0 E1 F0 F1 G0 G1 H0 H1 |
| MIXL.OB t1, s2, s3 | E2 E3 F2 F3 G2 G3 H2 H3 |
| MIXL.OB t2, s4, s5 | E4 E5 F4 F5 G4 G5 H4 H5 |
| MIXL.OB t3, s6, s7 | E6 E7 F6 F7 G6 G7 H6 H7 |

-continued

| | |
|---|---|
| MIXL.QH u0, t0, t1 | E0 E1 E2 E3 F0 F1 F2 F3 |
| MIXL.QH u1, t2, t3 | E4 E5 E6 E7 F4 F5 F6 F7 |
| MIXL.QH u2, t0, t1 | G0 G1 G2 G3 H0 H1 H2 H3 |
| MIXL.QH u3, t2, t3 | G4 G5 G6 G7 H4 H5 H6 H7 |
| REPA.QH d0, u0, u1 | E0 E1 E2 E3 E4 E5 E6 E7 |
| REPB.QH d1, u0, u1 | F0 F1 F2 F3 F4 F5 F6 F7 |
| REPA.QH d2, u2, u3 | G0 G1 G2 G3 G4 G5 G6 G7 |
| REPB.QH d3, u2, u3 | H0 H1 H2 H3 H4 H5 H6 H7 |

In another example, an exemplary 4×4 array block consists of following elements:

| | d0 | d1 | d2 | d3 |
|---|---|---|---|---|
| s0 | A | B | C | D |
| s1 | E | F | G | H |
| s2 | I | J | K | L |
| s3 | M | N | O | P |

A transpose operation of the 4×4 array block in QH mode uses 8 shuffle instructions as follows:

| | |
|---|---|
| MIXH.QH t0, s0, s1 | A E B F |
| MIXH.QH t1, s2, s3 | I M J N |
| REPA.QH d0, t0, t1 | A E I M |
| REPB.QH d1, t0, t1 | B F J N |
| MIXL.QH t0, s0, s1 | C G D H |
| MIXL.QH t1, s2, s3 | K O L P |
| REPA.QH d2, t0, t1 | C G K O |
| REPB.QH d3, t0, t1 | D H L P |

The shuffle instructions such as BFLA and BFLB allow reversing the order of elements in an array, in pairs or groups of 4. Larger groups can be reordered by memory or register address because they are a multiple of 64 bit elements. Inverting the order of a large array can be accomplished by inverting each vector of 4 elements with BFLB and loading from or storing each doubleword to the mirrored address in the array. Similarly, a butterfly on a large array can be assembled from double word addressing and BFLA or BFLB operations on the addressed doublewords.

The present invention thus provides a method for providing element alignment and ordering for SIMD processing. While the present invention has been described in particular embodiments, it should be appreciated that the present invention should not be construed as being limited by such embodiments, but rather construed according to the claims below.

What is claimed is:

1. A microprocessor having a plurality of registers, comprising:
a first processing unit that
in response to a first load instruction loads a first plurality of data bytes into a first register,
in response to a second load instruction loads a second plurality of data bytes into a second register, and
in response to an alignment instruction determines a starting data byte in the first register, wherein the starting data byte specifies a first data byte of an aligned vector, extracts the aligned vector from the first register and the second register beginning from a first bit in the starting byte of the first register continuing through bits in the second register, and replicates the aligned vector into a third register such that the third register contains a plurality of data elements aligned for single instruction multiple data (SIMS) processing; and
a SIMD processing unit coupled to the first processing unit that operates on the aligned vector.

2. The microprocessor of claim 1, wherein the starting data byte is specified by a variable in a field of the alignment instruction.

3. The microprocessor of claim 1, wherein the first plurality of data byte and the second plurality of data bytes are loaded from contiguous locations of a memory unit.

4. The microprocessor of claim 1, wherein the first processing unit operates in a big-endian byte ordering mode.

5. The microprocessor of claim 1, wherein the first processing unit operates in a little-endian byte ordering mode.

6. A micorprocessor having a plurality of registers, comprising
a first processing unit that
in response to a first load instruction loads a first plurality of data bytes into a first register,
in response to a second load instruction loads a second plurality of data bytes into a second register, and
in response to a shuffle instruction reads a first plurality of data elements from the first register and a second plurality of data elements from the second register, and
writes the first plurality of data elements and the second plurality of data elements into a third register in a particular order specified by the shuffle instruction to produce avector having a plurality of data elements aligned for single instruction multiple data (SIMD) processing; and
a SIMD processing unit coupled to the first processing unit that operates on the vector.

7. The microprocessor of claim 6, wherein in response to the shuffle instruction, the first processing unit.
writes zero-extended data elements of the first register to the third register.

8. The microprocessor of claim 6, wherein in response to the shuffle instruction, the first processing unit
writers sign-extended data elements of the first register to the third register.

9. The microprocessor of claim 6, wherein in response to the shuffle instruction, the first processing unit
reads a first subset of data elements from the first register, the first subset of data elements comprising any one of the following groups of data elements from the first register: odd elements, even elements, lower elements and upper elements; and
reads a second subset of data elements from the second register, the second subset of data elements comprising any one of the following groups of data elements from the second register: odd elements, even elements, lower elements and upper elements.

10. The microprocessor of claim 9, wherein in response to the shuffle instruction, the first processing unit
writes the first subset of data elements and the second subset of data elements into the third register.

11. The microprocessor of claim 6, wherein the vector in the third register comprises a plurality of 8-bit data elements.

12. The microprocessor of claim 6, wherein the vector in the third register comprises a plurality of 16-bit data elements.

13. A microprocessor having a plurality of registers, comprising:

a first processing unit that in response to an alignment instruction determines a starting data byte in a first register specified by the alignment instruction, wherein the starting data byte specifies a first data byte of a first vector, extracts the first vector from the first register specified by the alignment instruction and a second register specified by the alignment instruction beginning from a first bit in the starting byte of the first register specified by the alignment instruction continuing through bits in the second register specified by the alignment instruction, and replicates the first vector into a third register specified by the alignment instruction such that the third register specified by the alignment instruction contains a plurality of data elements aligned for single instruction multiple data (SIMD) processing; and in response to a shuffle instruction reads a first plurality of data elements from a first register specified by the shuffled instruction and a second plurality of data elements from a second register specified specified by the shuffle instruction, and writes the first plurality of data elements and the second plurality of data elements into a third register specified by the shuffle instruction, in a particular order specified by the shuffle instruction, to produce a second vector aligned for SIMD processing; and a SIMD processing unit coupled to the first processing unit that operates on vectors aligned for SIMD processing.

14. The microprocessor of claim 13, wherein in response to the shuffle instruction, the first processing unit writes zero-extended data of the first register to the third register.

15. The microprocessor of claim 13, wherein in response to the shuffle instruction, the first processing unit writes sign-extended data elements of the first register to the third register.

16. The microprocessor of claim 13, wherein the starting data byte is specified by a variable in a field of the alignment instruction.

17. The microprocessor of claim 13, wherein the first processing unit operates in a big-endian byte ordering mode.

18. The microprocessor of claim 13, wherein the first processing unit operates in a little-endian byte ordering mod.

* * * * *

UNITED STATES PATENT AND TRADEMARK OFFICE
CERTIFICATE OF CORRECTION

PATENT NO. : 7,197,625 B1
APPLICATION NO. : 09/662832
DATED : March 27, 2007
INVENTOR(S) : Van Hook et al.

It is certified that error appears in the above-identified patent and that said Letters Patent is hereby corrected as shown below:

Title Page
Item [63], Related U.S. Application Data section please replace "5,266,738" with --5,266,758--.
Item [63], Related U.S. Application Data section please replace "5,933,630" with --5,933,650--.
Title page illustrating a fig. should be deleted, and replaced with new title page illustrating a fig. (attached).

Drawings
Delete Drawing Sheets 1-17, and replace with Drawing Sheets 1-17. (attached)

Column 16
Line 3 replace "(SIMS)" with --(SIMD)--.
Line 11 replace "data byte and" with --data bytes and--.
Line 19 replace "comprising" with --comprising: --.
Line 33 replace "avector" with --a vector--.
Line 39 replace "unit." with --unit--.
Line 44 replace "writers" with --writes--.

Column 17
Line 23 replace "specified specified" with --specified--.

Column 18
Line 11 replace "data of" with --data elements of--.
Line 22 replace "ordering mod." with --ordering mode.--.

Signed and Sealed this

Eleventh Day of December, 2007

JON W. DUDAS
*Director of the United States Patent and Trademark Office*

(12) United States Patent
van Hook et al.

(10) Patent No.: US 7,197,625 B1
(45) Date of Patent: *Mar. 27, 2007

(54) ALIGNMENT AND ORDERING OF VECTOR ELEMENTS FOR SINGLE INSTRUCTION MULTIPLE DATA PROCESSING

(75) Inventors: Timothy J. van Hook, Atherton; Peter Hsu, Fremont; William A. Huffman, Los Gatos; Henry P. Moreton, Woodside; Earl A. Killian, Los Altos Hills, all of CA (US)

(73) Assignee: MIPS Technologies, Inc., Mountain View, CA (US)

(*) Notice: Subject to any disclaimer, the term of this patent is extended or adjusted under 35 U.S.C. 154(b) by 151 days.

This patent is subject to a terminal disclaimer.

(21) Appl. No.: 09/662,832

(22) Filed: Sep. 15, 2000

Related U.S. Application Data

(63) Continuation of application No. 09/263,798, filed on Mar. 5, 1999, now Pat. No. 6,266,738, which is a continuation of application No. 08/947,649, filed on Oct. 9, 1997, now Pat. No. 5,933,639.

(51) Int. Cl.
*G06F 15/80* (2006.01)
*G06F 9/312* (2006.01)

(52) U.S. Cl. .................. 712/22; 712/4; 712/227
(58) Field of Classification Search .................. 712/2, 712/22, 20, 1, 4, 3, 5, 204, 6, 7, 17, 8, 9, 712/21, 120, 98, 19, 23, 24, 25, 248, 36, 712/210, 41, 213, 42, 273, 245, 300; 711/201, 711/153, 208, 148, 209, 171, 212, 172, 219; 710/50, 51, 66, 33, 127, 34
See application file for complete search history.

(56) References Cited

U.S. PATENT DOCUMENTS 3,654,621 A   4/1972   Bock et al.   ............ 340/172.5
3,916,388 A   10/1975  Shimp et al.  ............ 340/172.5

(Continued)

FOREIGN PATENT DOCUMENTS

| EP | 0 681 236 A1 | 11/1995 |
| EP | 0 681 236 B1 | 11/2000 |
| WO | WO 97/07450 A1 | 2/1997 |
| WO | WO 97/08608 A1 | 3/1997 |

OTHER PUBLICATIONS

*An Introduction to Thumb™*, Version 2.0, Advanced RISC Machines, 29 pages (Mar. 1995).

(Continued)

*Primary Examiner*—Daniel H. Pan
(74) *Attorney, Agent, or Firm*—Sterne Kessler Goldstein & Fox PLLC

(57) ABSTRACT

The present invention provides alignment and ordering of vector elements for SIMD processing. In the alignment of vector elements for SIMD processing, one vector is loaded from a memory unit into a first register and another vector is loaded from the memory unit into a second register. The first vector contains a first byte of an aligned vector to be generated. Then, a starting byte specifying the first byte of an aligned vector is determined. Next, a vector is extracted from the first register and the second register beginning from the first bit in the first byte of the first register continuing through the bits in the second register. Finally, the extracted vector is replicated into a third register such that the third register contains a plurality of elements aligned for SIMD processing. In the ordering of vector elements for SIMD processing, a first vector is loaded from a memory unit into a first register and a second vector is loaded from the memory unit into a second register. Then, a subset of elements are selected from the first register and the second register. The elements from the subset are then replicated into the elements in the third register in a particular order suitable for subsequent SIMD vector processing.

18 Claims, 17 Drawing Sheets

| 63 | | | | | | | 0 | |
|---|---|---|---|---|---|---|---|---|
| vd[7] | vd[6] | vd[5] | vd[4] | vd[3] | vd[2] | vd[1] | vd[0] | ~702 |
| 0 | vs[7] | 0 | vs[6] | 0 | vs[5] | 0 | vs[4] | ~704 |
| 0 | vs[3] | 0 | vs[2] | 0 | vs[1] | 0 | vs[0] | ~706 |
| sign vs[7] | vs[7] | sign vs[6] | vs[6] | sign vs[5] | vs[5] | sign vs[4] | vs[4] | ~708 |
| sign vs[3] | vs[3] | sign vs[2] | vs[2] | sign vs[1] | vs[1] | sign vs[0] | vs[0] | ~710 |
| vs[7] | vs[6] | vs[5] | vs[4] | vt[7] | vt[5] | vt[3] | vt[1] | ~712 |
| vs[6] | vs[4] | vs[2] | vs[0] | vt[6] | vt[4] | vt[2] | vt[0] | ~714 |
| vs[7] | vt[7] | vs[6] | vt[6] | vs[5] | vt[5] | vs[4] | vt[4] | ~716 |
| vs[3] | vt[3] | vs[2] | vt[2] | vs[1] | vt[1] | vs[0] | vt[0] | ~718 |

| | 702 | 704 | 706 | 708 | 710 | 712 | 714 | 716 | 718 |
|---|---|---|---|---|---|---|---|---|---|
| 0 | vd[0] | vs[4] | vs[0] | vs[4] | vs[0] | vt[1] | vt[0] | vt[4] | vt[0] |
| | vd[1] | 0 | 0 | sign vs[4] | sign vs[0] | vt[3] | vt[2] | vs[4] | vs[0] |
| | vd[2] | vs[5] | vs[1] | vs[5] | vs[1] | vt[5] | vt[4] | vt[5] | vt[1] |
| | vd[3] | 0 | 0 | sign vs[5] | sign vs[1] | vt[7] | vt[6] | vs[5] | vs[1] |
| | vd[4] | vs[6] | vs[2] | vs[6] | vs[2] | vs[1] | vt[0] | vt[6] | vt[2] |
| | vd[5] | 0 | 0 | sign vs[6] | sign vs[2] | vs[3] | vt[2] | vs[6] | vs[2] |
| | vd[6] | vs[7] | vs[3] | vs[7] | vs[3] | vs[5] | vs[4] | vt[7] | vt[3] |
| 63 | vd[7] | 0 | 0 | sign vs[7] | sign vs[3] | vs[7] | vs[6] | vs[7] | vs[3] |

FIG. 7

| 63 | | | 0 | |
|---|---|---|---|---|
| vd[3] | vd[2] | vd[1] | vd[0] | ~902 |
| vs[3] | vt[3] | vs[2] | vt[2] | ~904 |
| vs[1] | vt[1] | vs[0] | vt[0] | ~906 |
| vs[3] | vs[1] | vt[3] | vt[1] | ~908 |
| vs[2] | vs[0] | vt[2] | vt[0] | ~910 |
| vs[2] | vt[3] | vs[0] | vt[1] | ~912 |
| vs[0] | vt[1] | vs[2] | vt[3] | ~914 |
| vs[3] | vs[2] | vt[3] | vt[2] | ~916 |
| vs[1] | vs[0] | vt[1] | vt[0] | ~918 |

FIG. 9